(12) United States Patent
Sieber et al.

(10) Patent No.: US 8,366,410 B2
(45) Date of Patent: Feb. 5, 2013

(54) WAVE TRANSDUCE HAVING VARIABLE ENERGY PISTON ASSEMBLY

(75) Inventors: Joseph D. Sieber, Qualicum Beach (CA); Steve A. Sieber, Qualicum Beach (CA)

(73) Assignee: Joseph D. Sieber, Qualicum Beach, BC (CA)

( * ) Notice: Subject to any disclaimer, the term of this patent is extended or adjusted under 35 U.S.C. 154(b) by 838 days.

(21) Appl. No.: 12/374,663

(22) PCT Filed: Jul. 19, 2007

(86) PCT No.: PCT/CA2007/001294
§ 371 (c)(1),
(2), (4) Date: Jan. 21, 2009

(87) PCT Pub. No.: WO2008/009131
PCT Pub. Date: Jan. 24, 2008

(65) Prior Publication Data
US 2009/0284014 A1  Nov. 19, 2009

Related U.S. Application Data

(60) Provisional application No. 60/807,874, filed on Jul. 20, 2006.

(51) Int. Cl.
*F04B 35/00* (2006.01)
(52) U.S. Cl. .......................... 417/331; 417/332; 290/53
(58) Field of Classification Search .................. 417/331, 417/332, 330; 290/52, 53
See application file for complete search history.

(56) References Cited

U.S. PATENT DOCUMENTS

| | | | |
|---|---|---|---|
| 4,012,173 A | 3/1977 | Everson, Jr. | |
| 4,326,840 A * | 4/1982 | Hicks et al. | 417/331 |
| 5,244,359 A * | 9/1993 | Slonim | 417/332 |
| 2008/0012344 A1* | 1/2008 | Buffard et al. | 290/53 |

FOREIGN PATENT DOCUMENTS

| | | |
|---|---|---|
| EP | 1795334 A1 | 6/2007 |
| GB | 1591727 | 11/1977 |
| WO | 90/11445 A1 | 10/1990 |
| WO | 94/09273 | 4/1994 |

* cited by examiner

*Primary Examiner* — Karabi Guharay
(74) *Attorney, Agent, or Firm* — Clark Wilson LLP; Michael J. Roman

(57) ABSTRACT

The present invention relates to a way to adapt a wave transducer to the actual amplitude of incident waves, so as to improve the efficiency of energy conversion. The adaptation includes a variable-energy piston assembly and a tapered float.

64 Claims, 8 Drawing Sheets

WAVE TRANSDUCE HAVING VARIABLE ENERGY PISTON ASSEMBLY

CROSS REFERENCE TO RELATED APPLICATIONS

This application claims priority from U.S. Provisional Patent Application Ser. No. 60/807,874 filed on Jul. 20, 2006, entitled WAVE TRANSDUCER HAVING VARIABLE ENERGY PISTON, which is expressly incorporated by reference herein.

BACKGROUND OF THE INVENTION

1. Field of the Invention

The present invention relates to pistons adapted to convert energy from waves, for example waves in a body of water such as an ocean, lake or river.

2. Description of Related Art

A piston submerged in a body of water may be operated to pressurize a fluid in response to buoyancy forces periodically applied to and removed from a float connected to the distal end of its piston rod by surface waves travelling through the body of water. In this way, some kinetic energy of the incident waves can be converted to potential energy of the pressurized fluid.

However, pistons that have been conventionally adapted for this application suffer from a significant disadvantage: their conversion efficiency declines when incident waves have an amplitude other than an optimal amplitude. At best, a conventional piston may be adapted to have maximum efficiency at the average amplitude for waves in the region where the piston is installed; however, incident waves will have actual amplitudes that occupy a wide range around the average. Furthermore, the average itself is likely to vary over the short term with weather conditions and tides and over the longer term with the seasons and even longer patterns of climate change.

What is needed therefore, is a piston that adapts to the actual amplitude of incident waves so as to improve the efficiency of energy conversion. The present invention is directed to this need.

SUMMARY OF THE INVENTION

In general terms, the present invention includes a variable energy piston assembly that accommodates and exploits variable wave amplitudes. As wave amplitude increases, it is possible to increase both the buoyancy forces acting on the piston and the length of the piston's stroke. This adaptation capitalizes on the realization that wave energy increases as the square of wave amplitude. However, as wave amplitudes decrease, it is desirable to decrease the length of stroke, lest the smaller movement of the waves be insufficient to effectively work the piston.

According to one aspect of the present invention, there is provided an apparatus for converting kinetic energy. The apparatus includes a piston assembly having:

a plurality of cylinders connected to receive a first fluid at a first pressure and to supply the first fluid at a second pressure that is higher than the first pressure;

a plurality of piston-heads, each of the plurality of piston-heads being operable to traverse within a respective one of the plurality of cylinders to receive, pressurize and supply the first fluid; and a piston rod assembly connected to urge a subset of the plurality of piston-heads to traverse in response to the kinetic energy, wherein membership of the subset at any instance is a function of the energy being converted.

This function might be implemented as a function of the extension of the piston rod assembly, for example. The function would generally provide that the aggregate piston-head area of the subset increases as the extension of the piston rod assembly increases. This function might well be discontinuous.

The aggregate piston-head area of the subset might increase in a number of different ways. For example, it might increase as a result of the membership of the subset gaining an increased number of the plurality of piston-heads as the piston rod assembly extends. As another example, it might increase as a result of the membership of the subset gaining larger-area ones of the plurality of piston-heads as the piston rod assembly extends. As still another example, it might increase as a result of at least one member of the subset increasing in area as the piston rod assembly extends.

The apparatus might further include:

a low-pressure chamber operable to store the first fluid at the first pressure, at least one of the plurality of cylinders being connected to the low-pressure chamber to receive the first fluid at the first pressure; and an intermediate-pressure chamber operable to store the first fluid at the second pressure, at least one of the plurality of cylinders being connected to the intermediate-pressure chamber to supply the first fluid at the second pressure, to create an "energy accumulator" in combination with the piston assembly.

The low-pressure chamber and the intermediate-pressure chamber might abut, perhaps sharing a common bulkhead. The low-pressure chamber and the intermediate-pressure chamber might even be formed integrally.

The apparatus might be configured such that:

at least one of the plurality of cylinders is connected to the low-pressure chamber via an inlet check-valve configured to permit the low-pressure chamber to supply the first fluid but not receive it; and at least one of the plurality of cylinders is connected to the intermediate-pressure chamber via an outlet check-valve configured to permit the intermediate-pressure chamber to receive the first fluid but not supply it.

In some configurations, for example some hydraulic configurations, there might also be a controlled pressure-relief valve connected between at least one of the plurality of cylinders and the low-pressure chamber to open in response to the retraction of the piston rod assembly regardless of the pressure difference between its ports.

At least one of the plurality of cylinders might be housed within the low-pressure chamber, perhaps abutting the bulkhead. In such an arrangement, the outlet check-valve could connect the at least one of the plurality of cylinders housed within the low-pressure chamber to the intermediate-pressure chamber through the bulkhead.

In another configuration, the low-pressure chamber might jacket the intermediate-pressure chamber instead of abutting one end of it. This configuration could include a low-resistance chamber abutting the low-pressure chamber and the intermediate-pressure chamber, the low-resistance chamber perhaps for example being filled with gas at no greater than the current ambient pressure. In this configuration, at least one of the plurality of cylinders might be housed within the low-resistance chamber, and if that cylinder were telescopic, it would be able to easily expand into the low-resistance chamber by compressing the ambient gas.

If the low-resistance chamber were located below the low-pressure chamber, then the at least one of the plurality of cylinders housed within the low-resistance chamber could be connected to the low-pressure chamber to receive the first fluid by gravity feed.

The apparatus might further include:

a platform for supporting the energy accumulator at a predetermined average distance below the surface of a second fluid, perhaps supporting the energy accumulator pivotally; and a float connected to the piston rod assembly opposite the plurality of piston-heads, the float being operable to float on the second fluid in the path of an incident wave and thereby urge the piston rod assembly to respectively extend and retract in response to the incident wave cresting and troughing.

The function could be implemented as a function of the separation between the float and the piston assembly.

In one arrangement, at least two of the plurality of cylinders are concentric and the respective at least two of the plurality of piston-heads are concentric with each other and with the at least two of the plurality of cylinders. In fact, the at least two of the plurality of cylinders and the at least two of the plurality of piston-heads could be telescopic.

In this arrangement, if a first of the respective at least two of the plurality of piston-heads (the "first piston-head") is a member of the subset, then a second of the respective at least two of the plurality of piston-heads (the "second piston-head") becomes a member when the disposition between the first piston-head and the second piston-head is within a threshold amount, for example a separation. Such an arrangement might include for example a catch operable to releasably connect the second piston-head to the first piston-head when the two are disposed within the threshold amount.

The second piston-head might be formed from the first piston-head and an annulus that circumscribes the first piston-head when first piston-head and the second piston-head are disposed within the threshold amount. This annulus could cap the one of the at least two of the plurality of cylinders that the first piston traverses.

Instead of a separation, the disposition might be a pressure of a volume of the first fluid captured between the first piston-head and the second piston-head. Whereas a separation threshold is well adapted to incompressible liquids, a pressure threshold is well adapted to compressible gases.

In this latter arrangement, the apparatus might further include a pressure-release valve in the second piston-head connected to transfer the first fluid pressurized to the threshold amount by the first piston-head for pressurization by the second piston-head.

In another configuration, the members of the subset of the plurality of piston-heads might be distributed for balance around the piston rod assembly. In this configuration:

a first one of the members of the subset of the plurality of piston-heads (the "first piston-head") is centered on the longitudinal axis of the piston rod assembly;

a second one of the plurality of piston-heads (the "second piston-head") is adjacent and parallel to the first piston-head; and a third one of the plurality of piston-heads (the "third piston-head") is adjacent and parallel to the first piston-head, opposite the second piston-head.

The second piston-head and the third piston-head might each become a member of the subset of the plurality of piston-heads when their respective disposition with the first piston-head is within a threshold amount, for example within a threshold separation. There might be for example a catch affixed to piston rod assembly and operable to releasably connect the first piston-head, the second piston-head and the third piston-head for simultaneous traverse when the respective disposition is within the threshold amount.

In any of these arrangements and confirmations, the buoyancy of the float could be variable, for example varying as a function of the separation between the float and the piston assembly, a function of the extension of the piston rod assembly, a function of the amplitude of the incident wave, a function of the energy of the incident wave, or a function of the energy being converted. Implementing these functions might include tapering the float narrower from top to bottom.

According to another aspect of the present invention, there is provided a method for converting kinetic energy. The method includes:

supplying a first fluid at a first pressure to a plurality of pistons; and in response to the kinetic energy, driving a subset of the pistons to pressurize the first fluid to a second pressure that is higher than the first pressure, wherein membership of the subset at any instance is a function of the energy being converted.

The function might be implemented as a function of the extension of a piston rod assembly. This function might well be discontinuous.

Driving a subset of the pistons could include increasing the aggregate piston-head area of the subset as the extension of the piston rod assembly increases.

Increasing the aggregate piston-head area of the subset could be accomplished in a number of ways. For example, it could include increasing the number of pistons that are members of the subset as the piston rod assembly extends. As another example, it might include introducing larger-area pistons as members of the subset as the piston rod assembly extends. As still another example, it could include increasing the area of at least one of the pistons that is a member of the subset as the piston rod assembly extends.

The method might further include:

supporting the pistons at a predetermined average distance below the surface of a second fluid; and transmitting the buoyant force of the second fluid acting upon a float in the path of an incident wave to the piston rod assembly, to urge the piston rod assembly to respectively extend and retract in response to incident wave cresting and troughing.

This function might be a function of the separation between the float and the pistons.

The method might further include varying the buoyancy of the float, for example in accordance with a function of the separation between the float and the pistons, in accordance with a function of the extension of the piston rod assembly, in accordance with a function of the amplitude of the incident wave, in accordance with a function of the energy of the incident wave, in accordance with a function of the energy being converted. Implementing these functions might include tapering the float narrower from top to bottom.

According to yet another aspect of the present invention, there is provided an apparatus for converting kinetic energy. The apparatus includes:

a plurality of means for receiving a first fluid at a first pressure and supplying the first fluid at a second pressure that is higher than the first pressure;

a plurality of means for pressurizing the first fluid, each of the plurality of pressurizing means cooperating with a respective one of the plurality of receiving and supplying means; and means for urging a subset of the plurality of pressurizing means to pressurize the first fluid in response to the kinetic energy, wherein membership of the subset at any instance is a function of the energy being converted.

This function might be implemented as a function of the instantaneous energy being converted. This function might well be discontinuous.

The function might provide that the aggregate area over which the plurality of pressurizing means work increases as the instantaneous energy being converted increases.

Increasing the aggregate area might be accomplished in a number of ways. For example, it could increase as a result of the membership of the subset gaining an increased number of the plurality pressurizing means. As another example, it could increase as a result of the membership of the subset gaining larger-area ones of the plurality of pressurizing means. As yet another example, it might increase as a result of at least one member of the subset increasing the area over which it applies pressure.

The apparatus might further include:
means for supporting the pressurizing means at a predetermined average distance below the surface of a second fluid; and
means for floating on the second fluid in the path of an incident wave connected to drive the urging means in response to the incident wave cresting and troughing.

In this arrangement, the function might be a function of the separation between the floating means and the pressurizing means.

The buoyancy of the floating means might be variable, for example as a function of the separation between the floating means and the pressurizing means, as a function of the amplitude of the incident wave, as a function of the energy of the incident wave, or as a function of the energy being converted. Implementing these functions might include tapering the floating means narrower from top to bottom.

Further aspects and advantages of the present invention will become apparent upon considering the following drawings, description, and claims.

DESCRIPTION OF THE INVENTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with a second label that distinguishes among the similar elements. If only the first reference label is identified in a particular passage of the detailed description, then that passage describes any one of the similar elements having the same first reference label irrespective of the second reference label.

Figure 1:
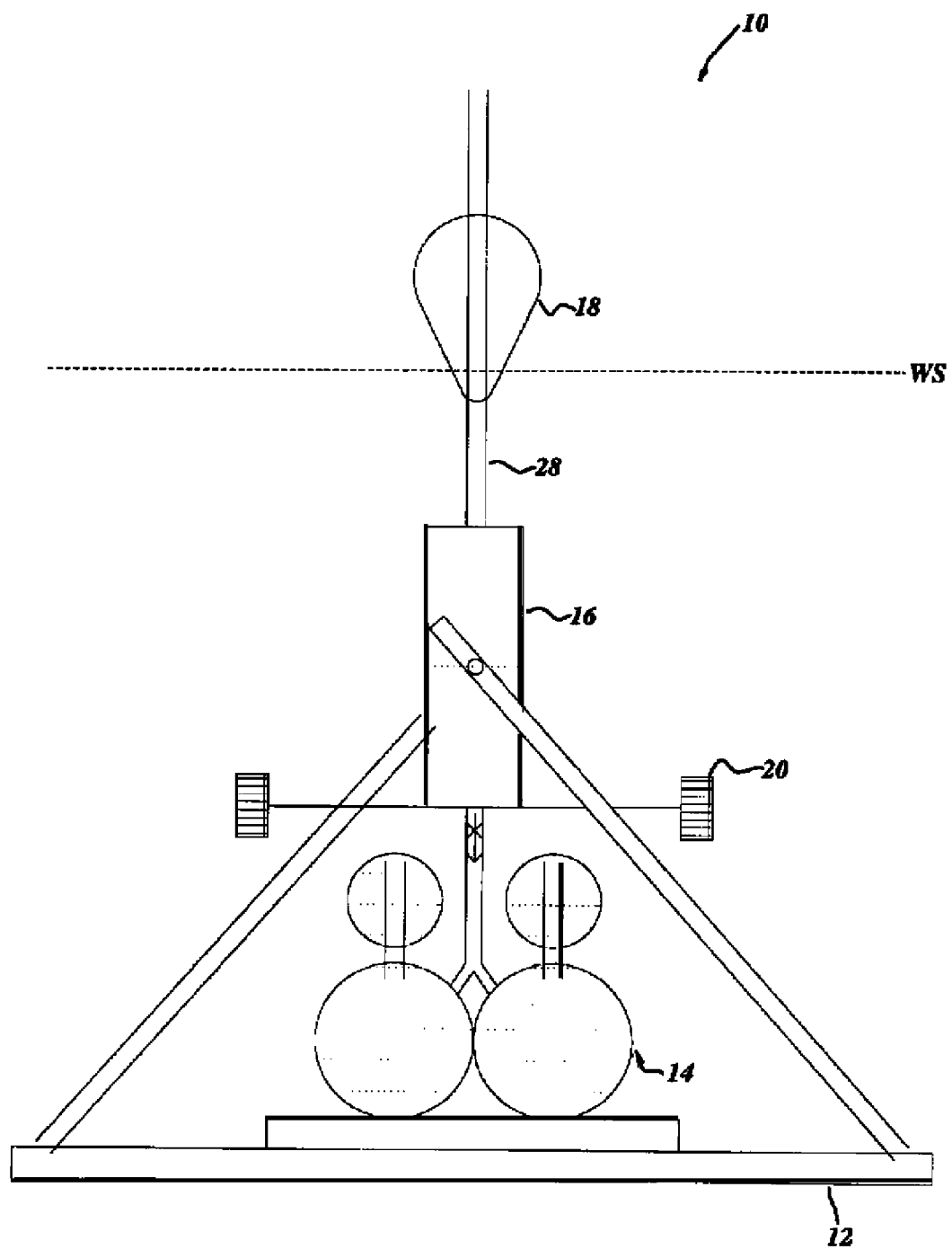
FIG. 1 is an elevational view of an energy accumulator that includes a wave transducer according to one aspect of the present invention.

DETAILED DESCRIPTION OF SPECIFIC EMBODIMENTS (a) Structure of Specific Embodiments The structure of the invention will now be illustrated by explanation of specific, non-limiting, exemplary embodiments shown in the drawing figures and described in greater detail herein.

Wave Transducer

There exist many arrangements by which a piston can harness energy from waves in a body of fluid—typically water—for transduction into other forms of energy. For purposes of illustration, embodiments of variable energy piston assemblies will be shown incorporated into a wave transducer, as generally illustrated at 10 in FIG. 1.

For ease of description, it will be assumed that all parts include appropriate packing to discourage fluid from flowing where it shouldn't and to encourage it to flow where it should. Furthermore, all tanks, chambers, reservoirs and the like for storing pressurized liquid will be assumed to include suitable pressurizing devices, for example internal gas bladders or the like.

The wave transducer 10 includes a submerged platform 12 that supports a high-pressure reservoir 14 and an energy accumulator 16 underwater and restrains a surface float 18 at the water surface WS. The platform 12 includes adjustable weights 20 or other ballast, floatation, or anchoring to hold the energy accumulator 16 and the float 18 in the proper disposition, both relative to each other and with respect to the surface of the water, as will be described in greater detail below. As illustrated, the platform 12 supports the energy accumulator 16 pivotally.

The float 18 is connected to operate the energy accumulator 16, buoyancy forces applied to the float 18 by incident waves travelling along the water surface WS causing the float 18 to rise and fall as the waves crest and trough, the float 18 urging the energy accumulator 16 to pressurize fluid in response.

The energy accumulator 16 is connected, singly or in combination with other energy accumulators (not shown), to supply the high-pressure reservoir 14 with pressurized fluid. Multiple energy accumulator 16 units could be supported on a single platform 12. Several platforms 12 might be hinged together to form a larger array, and a multiple of arrays could be connected to provide compressed fluid to a central reservoir from which compressed fluid would be drawn to drive a transducer, for example a turbine to convert wave energy into electricity. Those skilled in the art will of course recognize many different useful arrangements and applications for the variable energy piston assembly.

As will be seen more clearly below with reference to specifically illustrated embodiments, an energy accumulator 16 includes a low-pressure chamber 22 filled with fluid at a first pressure, an intermediate-pressure chamber 24 filled with fluid at a second pressure higher than the first pressure, and a variable energy piston assembly 26 connected to charge the intermediate-pressure chamber 24 with fluid from low-pressure chamber 22.

The top of the energy accumulator 16 is connected to the float 18 by means of a piston rod assembly 28. The piston rod assembly 28 might be made hollow for improved strength to weight ratio. The piston rod assembly 28 extends through the intermediate-pressure chamber 24 to the float 18. The float 18 urges the piston rod assembly 28 to respectively extend and retract in response to the incident waves cresting and troughing.

The energy accumulator 16 is supported in such a way that there is some degree of rotational motion (degrees of freedom) about the horizontal plane at the point of attachment. This arrangement allows a certain amount of rotation to accommodate not only the lateral shock effect of individual waves, but also provides for energy capture of related forces.

The variable energy piston assembly 26 may take a number of embodiments, including a multiplicity of the individual pistons (see FIGS. 3 and 7 below) or a telescopic piston (see FIGS. 5, 6 and 8 below). The variable energy piston assembly 26 might be embodied hydraulically (see FIGS. 3, 5 and 6 below) or pneumatically (see FIGS. 7 and 8 below).

Thus in general terms there is provided an apparatus for converting kinetic energy. The apparatus includes a variable energy piston assembly 26 having:
- a plurality of cylinders 30 connected to receive a first fluid at a first pressure and to supply the first fluid at a second pressure that is higher than the first pressure;
- a plurality of piston-heads 32, each of the plurality of piston-heads being operable to traverse within a respective one of the plurality of cylinders 30 to receive, pressurize and supply the first fluid; and
- a piston rod assembly 28 connected to urge a subset of the plurality of piston-heads 32 to traverse in response to the kinetic energy, wherein membership of the subset at any instance is a function of the energy being converted.

Expressed more generically, there is provided an apparatus for converting kinetic energy, having:
- a plurality of means for receiving a first fluid at a first pressure and supplying the first fluid at a second pressure that is higher than the first pressure;
- a plurality of means for pressurizing the first fluid, each of the plurality of pressurizing means cooperating with a respective one of the plurality of receiving and supplying means; and
- means for urging a subset of the plurality of pressurizing means to pressurize the first fluid in response to the kinetic energy, wherein membership of the subset at any instance is a function of the energy being converted.

Expressed still more generically, there is provided a method for converting kinetic energy, including:
- supplying a first fluid at a first pressure to a plurality of pistons; and
- in response to the kinetic energy, driving a subset of the pistons to pressurize the first fluid to a second pressure that is higher than the first pressure, wherein membership of the subset at any instance is a function of the energy being converted.

Float

Figure 2:
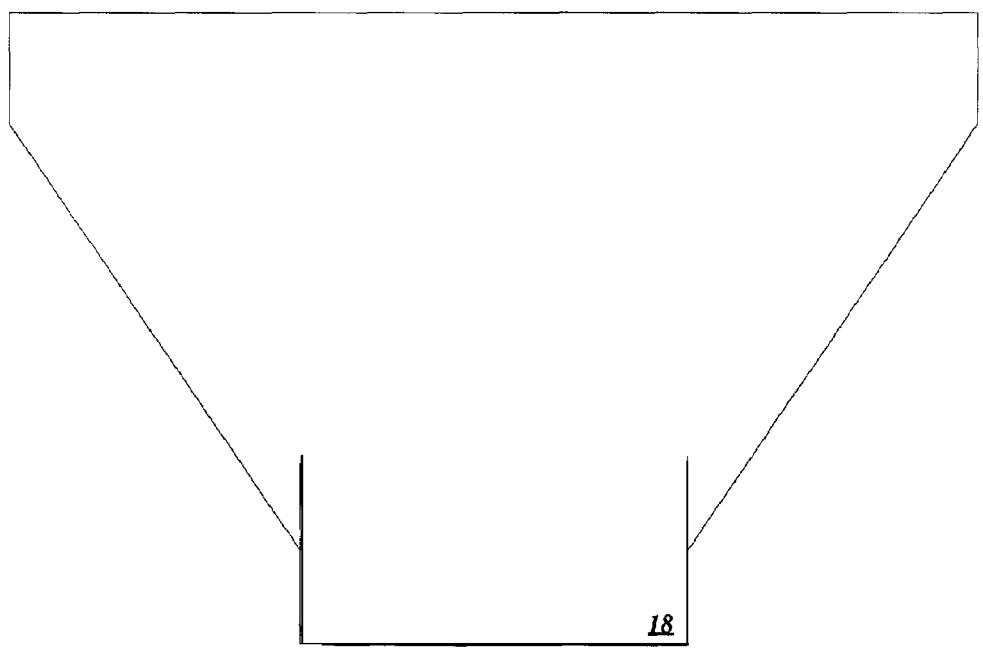
FIG. 2 is an elevational view of an alternative embodiment of a tapered float that forms part of the wave transducer of FIG. 1.

As best seen schematically in FIGS. 1 and 2, the lightweight surface float 18 is designed and sized to provide specific and variable buoyancy characteristics and could roughly be described in shape as a light bulb, screw-end down. This design also provides improved survivability characteristics in rough seas.

The design is such that an increasingly agitated sea—with higher amplitude waves—will force an increasing portion of the captive float to submerge, thereby engaging increased buoyant forces as a result of the increased depth of submergence and the increased diameter of the float 18. The increased buoyant forces will engage the increasing piston diameter and depth of stroke, and will therefore translate into increased energy capture.

There is an optimal (maximum) diameter for the float 18 for contact with the water in a given wave regime. It is generally understood that the maximum energy that can be absorbed by a heaving axi-symmetric body equals the wave energy transported by an incident wave front of width equal to the wavelength divided by $2\pi$. This width may be termed the "absorption width". Thus, for a wavelength of 30.64m (having a 5.45 second period), the maximum diameter of the float 18 should be 4.88m.

However, the diameter of the float 18 should be larger or smaller to respectively accommodate larger or smaller wave regimes and thus respective higher and lower available energy levels. In this regard, a tapered diameter can be an effective way for the float 18 to engage wave fronts of varying wavelength, and hence amplitude and energy.

Thus in general terms there is provided a float 18 with variable buoyancy. The piston rod assembly 28 urges the float 18 downwards and the captive float 18 submerges further when incident waves have larger amplitude. In this example, the float 18 is tapered narrower from top to bottom and so presents significantly larger displacement as it submerges further. In this regard, the buoyancy of the float 18 is a function of the extension of the piston rod assembly 28, or more indirectly the separation between the float 18 and the variable energy piston assembly 26. The buoyancy can also be seen as a function of the amplitude of the incident waves, and therefore a function of the energy of the incident wave and a function of the energy being converted.

First Embodiment Energy Accumulator

Figure 3:
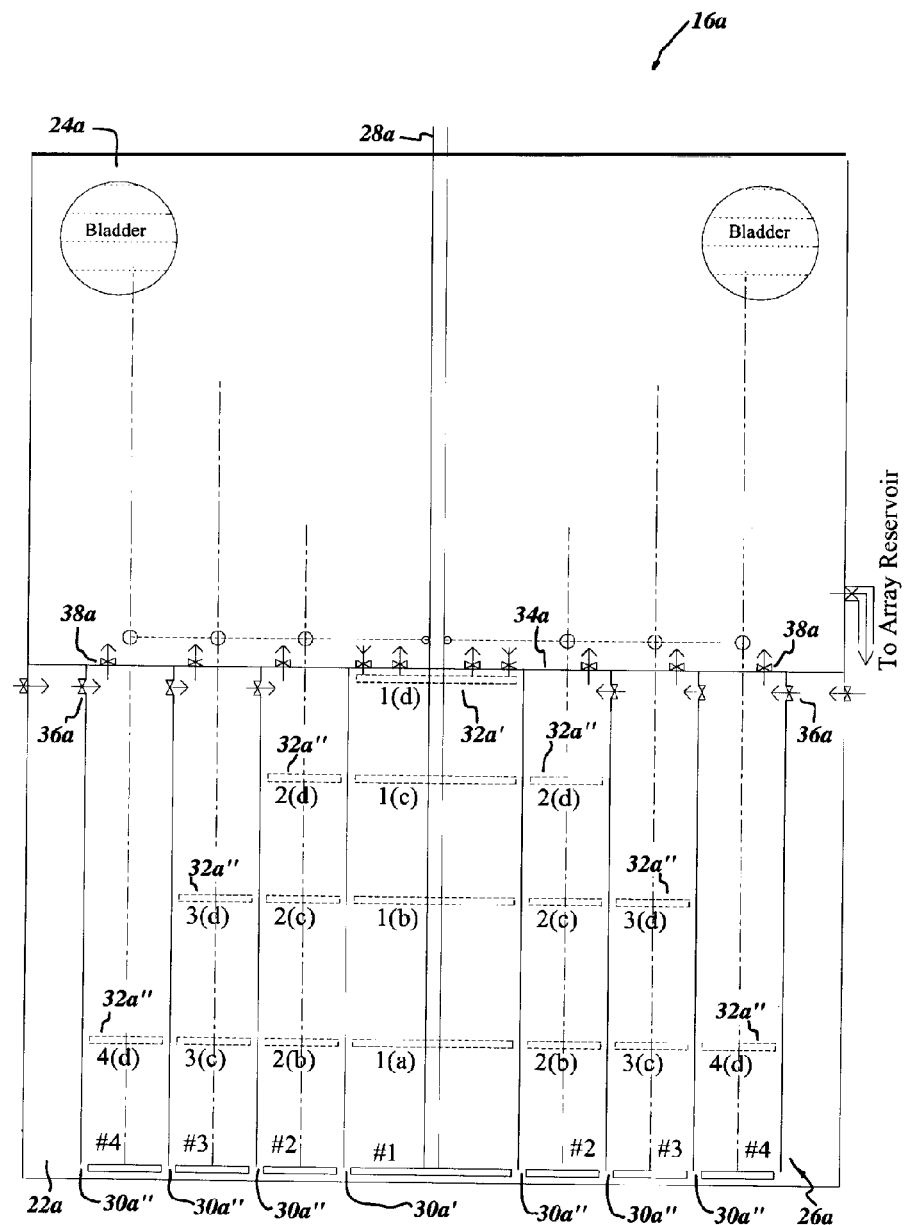
FIG. 3 is a cross-sectional view of a first embodiment of an energy accumulator that forms part of the wave transducer of FIG. 1, (a multi-piston hydraulic embodiment)
Figure 4:
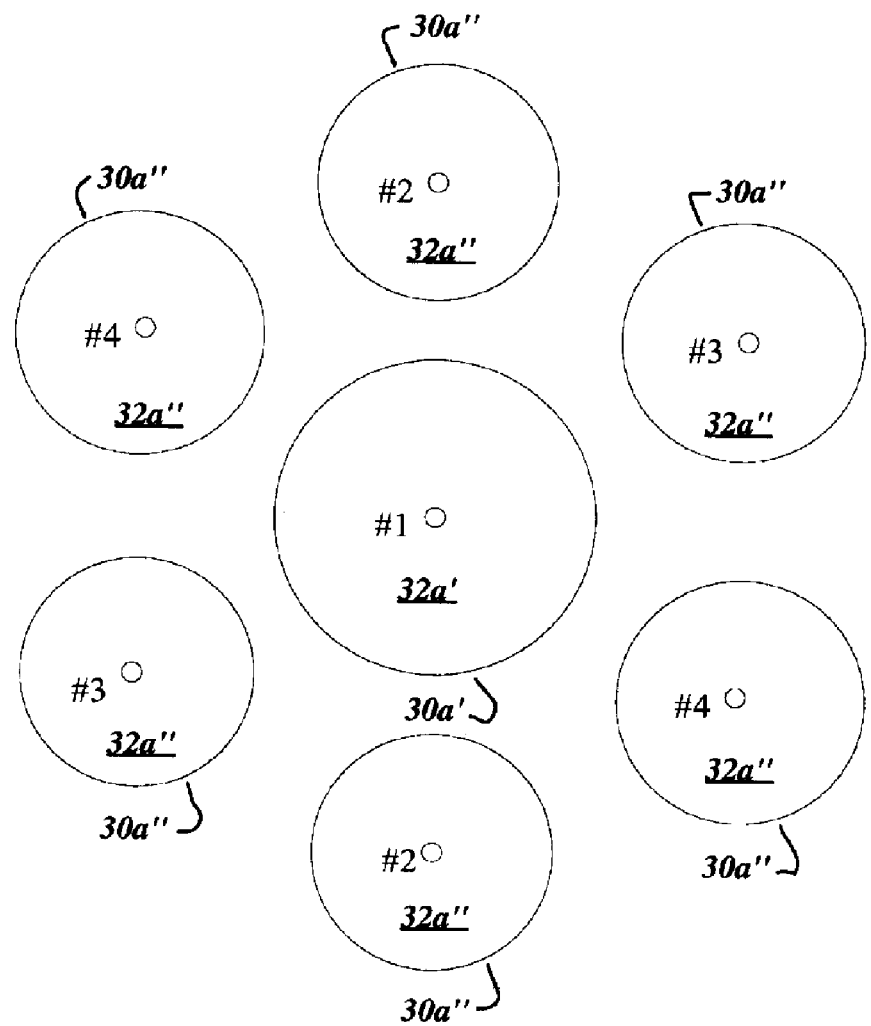
FIG. 4 is a plan view of the first embodiment energy accumulator of FIG. 3.

FIGS. 3 and 4 show an energy accumulator according to a first embodiment of the present invention, generally illustrated at 16a.

The energy accumulator 16a is divided into a low-pressure chamber 22a and an intermediate-pressure chamber 24a separated by a common bulkhead 34a. As illustrated, the low-pressure chamber 22a and the intermediate-pressure chamber 24a abut within an integral housing.

In this one of many possible working configurations, the low-pressure chamber 22a houses a primary cylinder 30a' surrounded by a plurality of secondary cylinders 30a" in generally parallel disposition with each other and with the primary cylinder 30a'. The primary cylinder 30a' houses a primary piston-head 32a' and the secondary cylinders 30a" house respective secondary piston-heads 32a".

The cylinders 30a each includes an inlet check-valve 36a connect to receive fluid from the low-pressure chamber 22a and an outlet check-valve 38a connected to supply fluid to the intermediate-pressure chamber 24a. As illustrated, at least one of the cylinders 30a housed within the low-pressure chamber 22a abuts the bulkhead 34a and connects to the intermediate-pressure chamber 24a through the bulkhead 34a via its respective outlet check-valve 38a.

The piston-heads 32a are suitably toggled at a piston rod assembly 28a to cooperatively function as a variable energy piston assembly 26a, as will be more fully described below with respect to operation. The piston rod assembly 28a links the secondary piston-heads 32a" together in groups, in this embodiment pairs on opposite sides of the primary piston-head 32a', to ensure mechanical balance. In general terms, the piston rod assembly 28a includes catches operable to releasably connect respective ones of the secondary piston-heads 32a" to the primary piston-head 32a' when the two are disposed within a threshold amount.

Thus, as best seen in FIG. 4, the secondary cylinders 30a" are arranged as three pairs, with each cylinder in the pair being offset by 180 degrees. In this embodiment, each of the secondary cylinders 30a" is radially spaced 60 degrees from adjacent ones.

Second Embodiment Energy Accumulator

Figure 5:
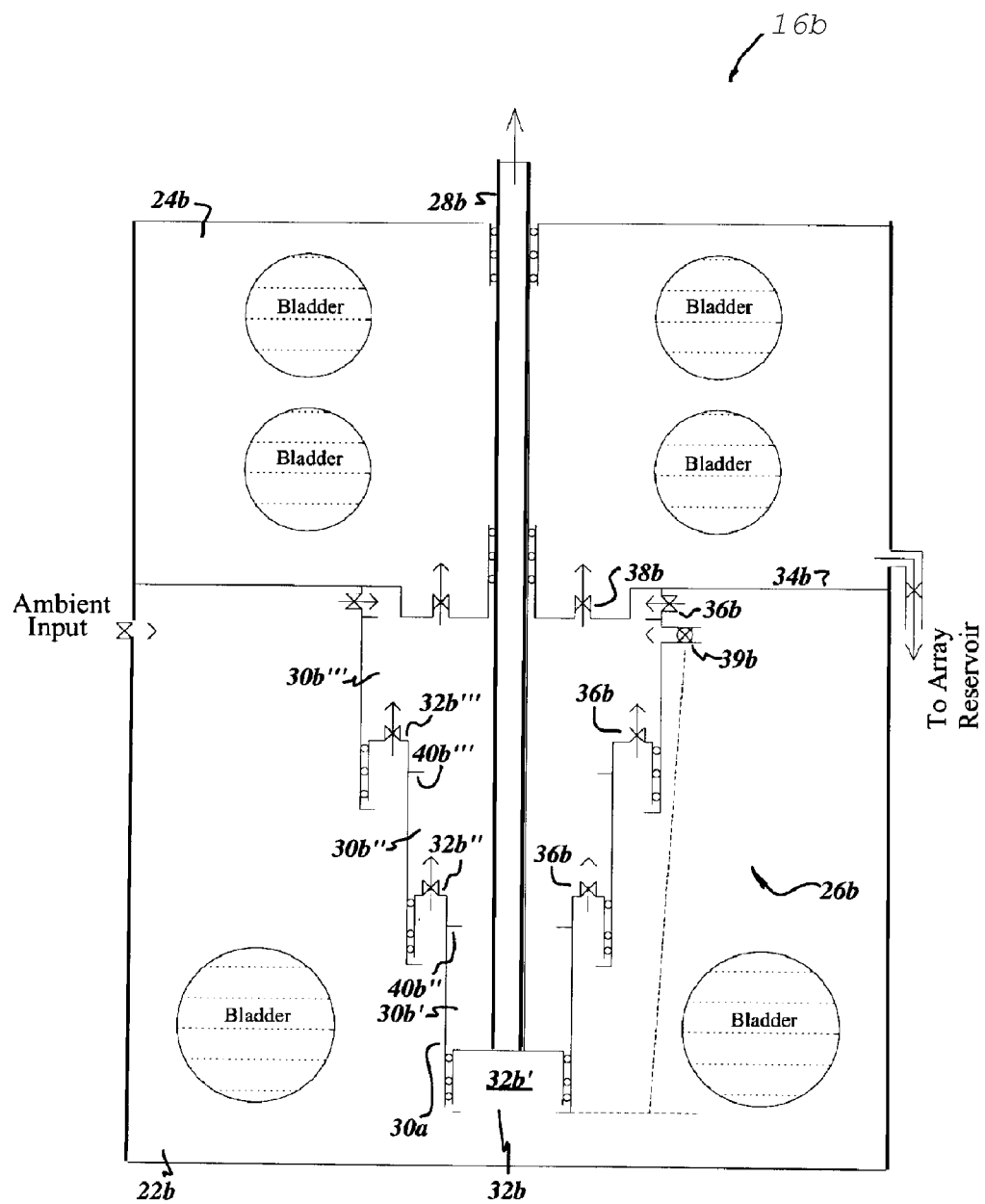
FIG. 5 is a cross-sectional view of second embodiment of an energy accumulator that forms part of the wave transducer of FIG. 1, (a first telescopic-piston hydraulic embodiment)

FIG. 5 shows an energy accumulator according to a second embodiment of the present invention, generally illustrated at 16b.

The energy accumulator 16b is divided into a low-pressure chamber 22b and an intermediate-pressure chamber 24b separated by a common bulkhead 34b.

This telescopic embodiment of a hydraulic variable energy piston assembly 26b is created by cooperation between a telescopic cylinder 30b, located within the low-pressure chamber 22b for discharge into the intermediate-pressure chamber 24b, and a telescopic piston-head 32b.

The telescopic piston-head 32b has a core 32b', a medial annulus 32b" concentric with and sized to circumscribe the core 32b', and an extreme annulus 32b''' concentric with and sized to circumscribe the medial annulus 32b".

The telescopic cylinder 30b has a core cavity 30b' sized to circumscribe the core 32b', a medial cavity 30b" concentric with the core cavity 30b' and sized to circumscribe the medial annulus 32b", which caps its distal end, and an extreme cavity 30b''' concentric with the medial cavity 30b" and sized to circumscribe the extreme annulus 32b''', which caps its distal end.

In effect, the core 32b' and the medial annulus 32b" form a second piston-head when they are disposed within a threshold amount and similarly the core 32b', the medial annulus 32b", and the extreme annulus 32b''' form a third piston-head when they are disposed within a threshold amount.

The telescopic cylinder 30b includes a plurality of inlet check-valves 36b connect to receive fluid from the low-pressure chamber 22b into the core cavity 30b', the medial cavity 30b" and the extreme cavity 30b'''. The telescopic cylinder 30b also includes a plurality of outlet check-valves 38b connected to supply fluid to the intermediate-pressure chamber 24b.

The piston rod assembly 28b extends from the core 32b' through the medial annulus 32b", on through the exterior annulus 32b''', on through the bulkhead 34b, through the intermediate-pressure chamber 24b, and out of the energy accumulator 16b to connect with the float 18.

The telescopic cylinder 30b also includes a controlled pressure-relief valve 39b, connected to relieve the pressure within the telescopic cylinder 30b to the pressure level of the low-pressure chamber 22b in response to the retraction of the piston rod assembly 28b. In other words, the controlled pressure-relief valve 39b is operable to open in response to the retraction of the piston rod assembly 28b regardless of the pressure difference between its ports The medial annulus 32b" includes a medial interior flange 40b" adapted to releasably and sealingly capture the core 32b'; the extreme annulus 32b''' includes a extreme interior flange 40b''' adapted to releasably and sealingly capture the medial annulus 32b". In other words, the medial interior flange 40b" and the extreme interior flange 40b''' each function as a catch operable to releasably connect piston-head when they are disposed within the threshold amount.

Those skilled in the art will recognize that a greater or lesser number of annuli and cavities could be used.

Third Embodiment Energy Accumulator

Figure 6:
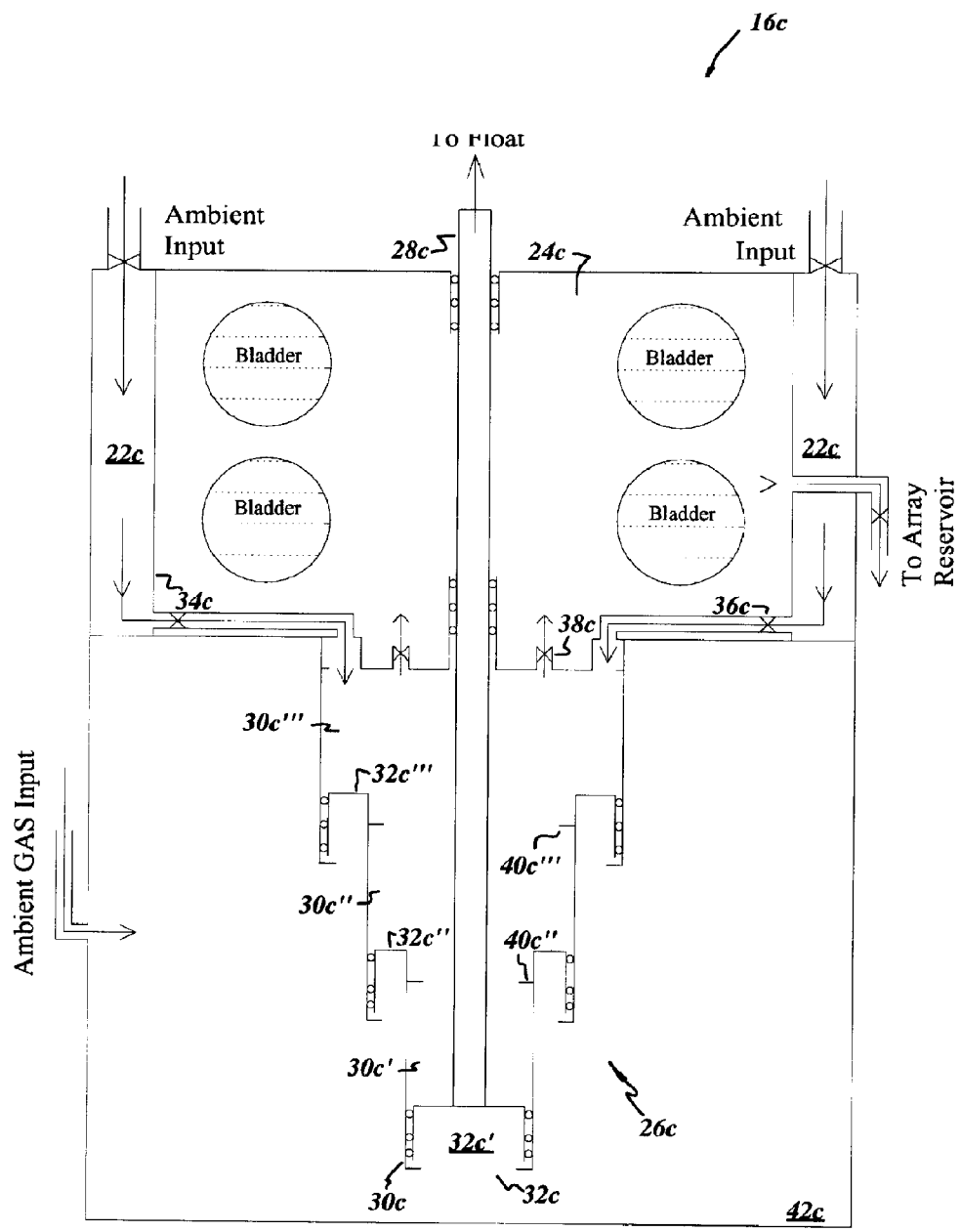
FIG. 6 is a cross-sectional view of third embodiment of an energy accumulator that forms part of the wave transducer of FIG. 1, (a second telescopic-piston hydraulic embodiment)

FIG. 6 shows an energy accumulator according to a third embodiment of the present invention, generally illustrated at 16c.

The third embodiment energy accumulator 16c is quite similar to the second embodiment energy accumulator 16b, both being telescopic hydraulic embodiments.

In this third embodiment energy accumulator 16c, the intermediate-pressure chamber 24c is jacketed by the low-pressure chamber 22c. A low-resistance chamber 42c abuts the low-pressure chamber 22c and the intermediate-pressure chamber 24c from below and houses the telescopic cylinder 30c in a gas atmosphere at or below the current ambient pressure, the gas being well adapted to easily change its position as the telescopic cylinder 30c operates. In this embodiment, the gas is air. This easy movement of gas results in reduced energy loss.

This arrangement provides a direct gravity feed from the low-pressure chamber 22c to the telescopic cylinder 30c below, without the loss of energy normally experienced in moving liquid about from a horizontally adjacent reservoir. Further, this arrangement doesn't require the use of pressure-relief valves; slight movement of the telescopic piston-head 32c downward will open the recharging inlet check-valves 36c.

Those skilled in the art will recognize that these features could also be applied to the multi-piston embodiment of FIGS. 3 and 4.

Fourth Embodiment Energy Accumulator

Figure 7:
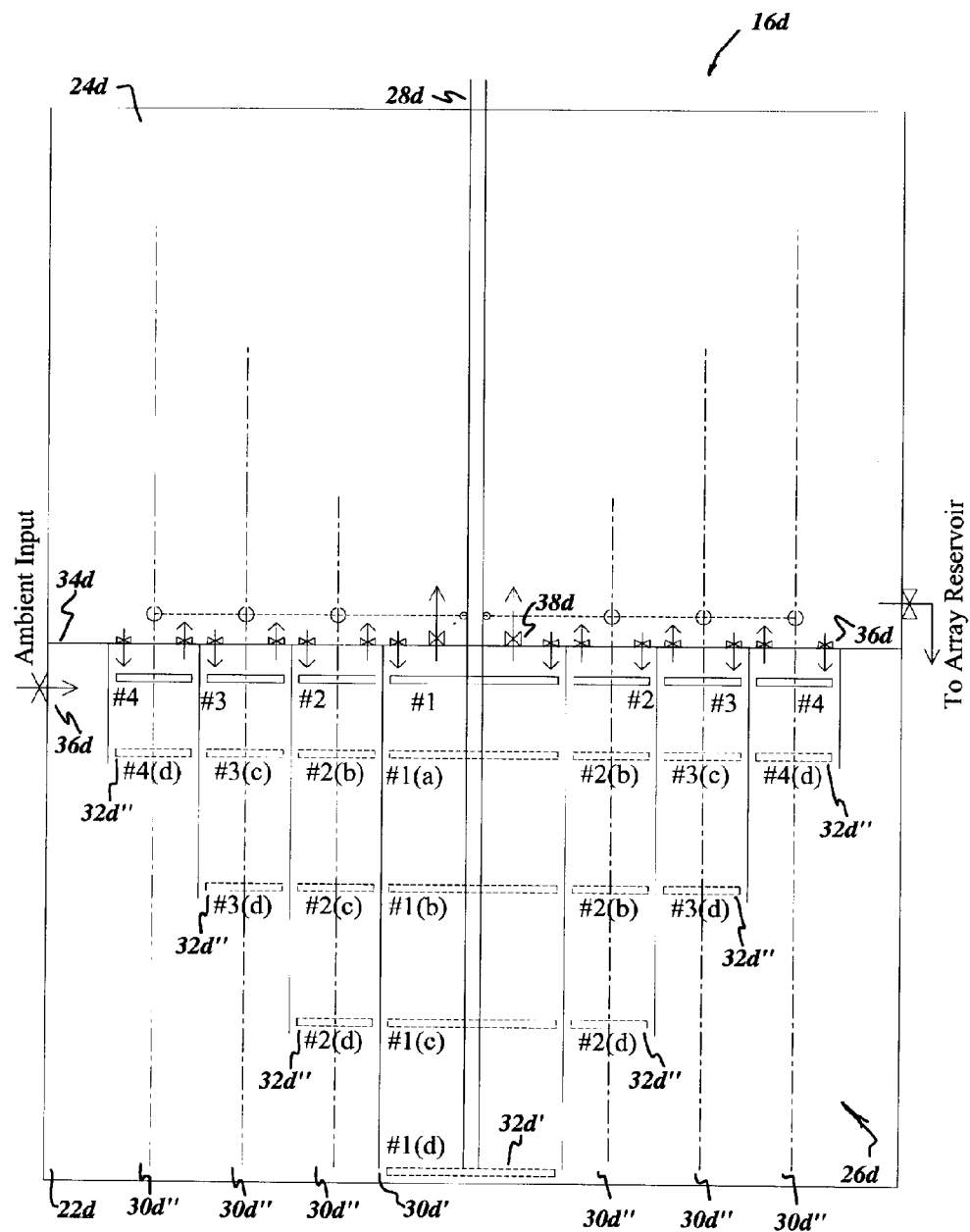
FIG. 7 is a cross-sectional view of a fourth embodiment of an energy accumulator that forms part of the wave transducer of FIG. 1, (a multi-piston pneumatic embodiment)

FIG. 7 shows an energy accumulator according to a fourth embodiment of the present invention, generally illustrated at 16d—a multi-piston pneumatic embodiment.

The description provided for the multi-piston hydraulic embodiment of FIGS. 3 and 4 generally applies for this pneumatic embodiment; however, compressing a gas is a very different process than pressurizing a liquid. Compressing a gas involves a change in volume directly and inversely related to the increase in pressure (assuming constant temperature in the gas). Compressing a gas involves a compression stage wherein the pressure is increased until a determined threshold pressure is reached, and a transfer stage that sees the transfer of compressed gas at the threshold pressure into a reservoir at this threshold pressure.

Thus, in designing the fourth embodiment variable energy piston assembly 26d, one considers the influencing characteristics and relationships of wave amplitude, depth of submergence of the float 18 and it's cross-sectional area, water displaced, and the stroke length of the piston-head assembly 32d.

Fifth Embodiment Energy Accumulator

Figure 8:
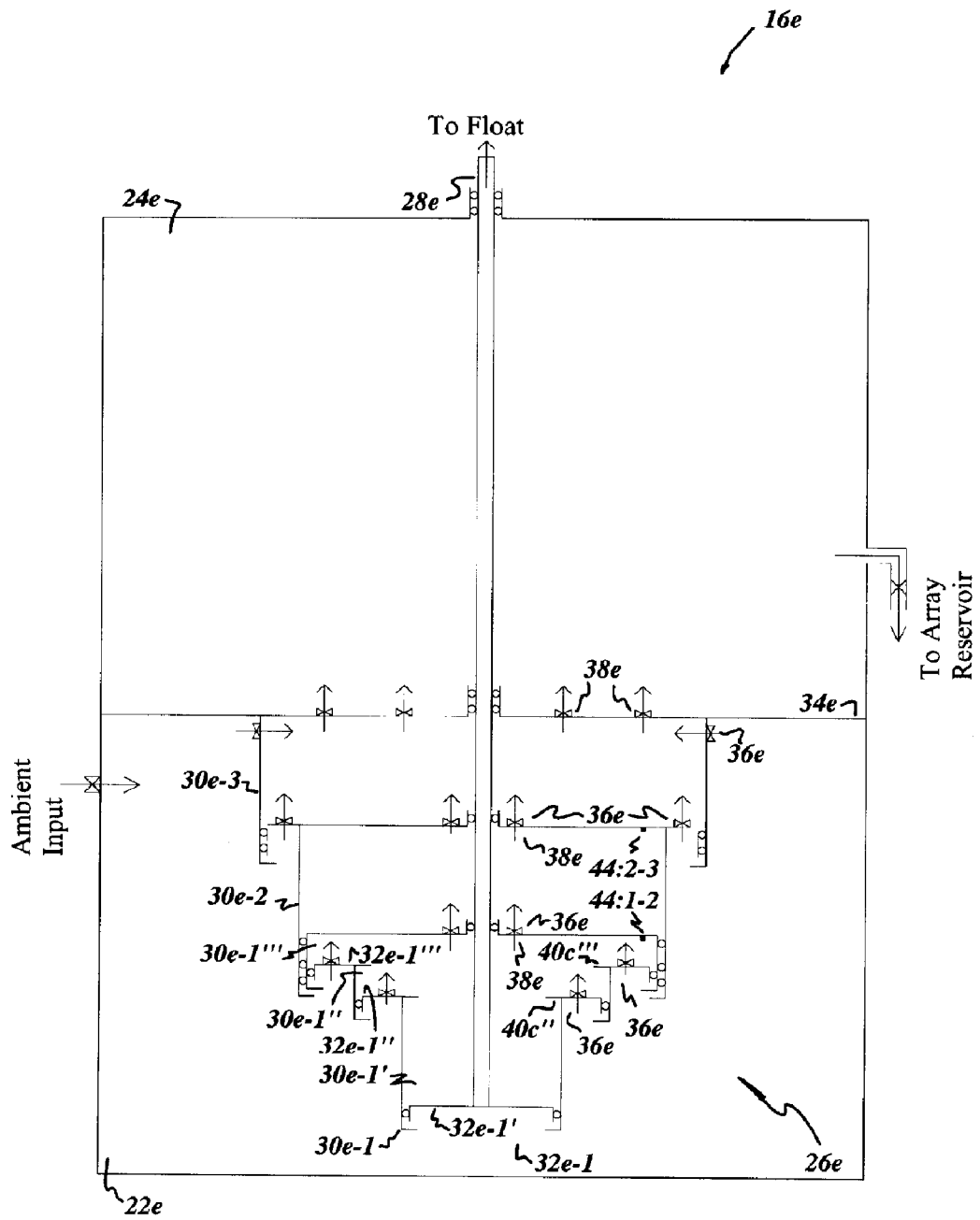
FIG. 8 is a cross-sectional view of fifth embodiment of an energy accumulator that forms part of the wave transducer of FIG. 1, (a telescopic-piston pneumatic embodiment).

FIG. 8 shows an energy accumulator according to a fifth embodiment of the present invention, generally illustrated at 16e—a telescopic pneumatic embodiment. The description provided for the telescopic hydraulic embodiment of FIG. 5 generally applies for this pneumatic embodiment; however, as described above, there are distinctions for better adapting the fifth embodiment to compressing a gas instead of pressurizing a liquid.

The first telescopic cylinder 30e allocates the bulk of its volume to the core cavity 30e'. Subsequent cavities, for example the medial cavity 30e" and the extreme cavity 30e''' can have larger diameters, but be of shorter stroke.

A pressure increase of less than double is recommended to complete the compression stage in a relatively short portion of stroke and to allocate the bulk of the stroke to the transfer stage, so as to transfer more gas and to reduce the risk of lost partial compression. Furthermore, the transfer portion of the stroke engages increasingly large-diameter piston-heads 32e, which in turn engages greater submergence of the float 18 to engage greater buoyant forces from incident waves.

When compressing a gas by enlisting the buoyant forces of waves, one quickly comes to realize that cylinder length becomes problematic. What is suitable for a wave-amplitude of 1 m is not suitable for any other wave amplitude, other factors remaining constant.

Thus the fifth embodiment additionally teaches a telescopic series connection of a plurality of telescopic cylinders 30e between the low-pressure chamber 22e and the intermediate-pressure chamber 24e, with a previous telescopic cylinder 30e connected to transfer gas compressed to a threshold pressure to a subsequent telescopic cylinder 30e via a check-valve, that check-valve functioning as an outlet check-valve 38e for the previous telescopic cylinder 30e and as an inlet check-valve 36e for the subsequent telescopic cylinder 30e.

Adjacent telescopic cylinders 30e are further interconnected by a latching assembly 44, connected to lock in place the telescopic piston-head 32e of a subsequent telescopic cylinder 30e except when the telescopic piston-head 32e of a subsequent telescopic cylinder 30e is within a predetermined distance of the subsequent telescopic cylinder 30e.

This piston-in-a-piston design allows a longer length of stroke for the piston rod assembly 28e when required and allows energy capture using increased diameter piston-heads 32e, thereby tapping into the increased energy inherent in larger incident waves.

(b) Operation of Specific Embodiments

With reference now to FIGS. 1-8, the operation of these specific embodiments of the invention will now be described.

Operation during calm sea conditions, represented by low energy waves, will see just sufficient submergence of the float 18 to provide the necessary displacement that will achieve the desired pressure when compressing a fluid.

Wave Transducer

FIG. 1 shows the wave transducer 10 positioned in a body of fluid, in this case water, to harness kinetic energy from waves travelling along the water surface WS.

In this regard, the platform 12 is disposed at a predetermined average distance below the water surface WS using the weights 20 or other floatation, ballasting, or anchoring to achieve the relationships discussed elsewhere herein between the float 18, the water surface WS, the piston rod assembly 28 and more generally the variable energy piston assembly 26.

Incident waves apply buoyant forces to the float 18, urging it to rise and fall as the waves crest and trough. In turn, the float 18 urges the piston rod assembly 28 in the energy accumulator 16 to extend and retract, thus driving the variable energy piston assembly 26 to pressurize low-pressure fluid received from the low-pressure chamber 22 and to supply the pressurized fluid to the intermediate-pressure chamber 24. In this manner, a group of energy accumulators 16 can supply high-pressure fluid to a high-pressure reservoir 14 for further use, for example to drive a turbine to generate electricity.

Float

FIG. 2 details the float 18. It will be appreciated that incident waves of larger amplitude will submerge the captive float 18 to a greater extent than incident waves of smaller amplitude.

To incident waves of smaller amplitude, the tapered float 18 presents a smaller displacement volume so as to be responsive to waves of lesser energy and a narrower diameter so as not to bridge adjacent wave crests. In other words, in relatively calm conditions the float 18 presents minimal natural damping and sufficient submergence to achieve the required buoyancy (minimal float 18 to water surface WS interface area), thereby providing the opportunity for maximum energy capture from low energy waves.

To incident waves of larger amplitude, the tapered float 18 presents increasing displacement and diameter to more fully extract the greater energy transmitted by the waves.

First Embodiment Energy Accumulator

FIGS. 3 and 4 show the first embodiment energy accumulator 16a—a multi-piston hydraulic embodiment. Under the urging of the float 18, the variable energy piston assembly 26a operates as follows.

For calm sea conditions, only the primary cylinder 30a' will operate, the primary piston-head 32a' working between the fully charged position and the 1 (a) position.

As sea conditions become somewhat more energetic and the waves incident on the float 18 have larger amplitudes, the primary piston-head 32a' travels beyond the 1 (a) position to the 1 (b) position and a first pair of secondary piston-heads 32a" (pair #2) is engaged by the piston rod assembly 28a and operate between the fully charged position and the 2(b) position.

The displacement of the float 18 will be such that the pressure desired is achieved in a submergence distance not to exceed (by design and choice), the distance represented by the 1(a) position. A determination of the pressure desired is directly related to the cross-sectional area of submergence and the depth of submergence water displaced.

As sea conditions become further energized and the waves incident on the float 18 have even larger amplitudes, the primary piston-head 32a' travels to the 1 (c) position, the first pair of secondary piston-heads 32a "(pair #2) travel to the 2(c) position, and a second pair of secondary piston-heads 32a" (pair #3) is engaged by the piston rod assembly 28a and travels to the 3(c) position.

Finally, with heavy seas and the waves incident on the float 18 having still larger amplitudes, the primary piston-head 32a' travels to the end of its stroke in the 1 (d) position, and each pair of secondary piston-heads 32a "moves to the (d) position.

The primary cylinder 30a' and secondary cylinders 30a" are recharged in the same sequence as they are pressed into duty.

As the stroke of the primary piston-head 32a' gets longer and each pair of secondary piston-heads 32a" is successively engaged by the piston rod assembly 28a, the engagement of each additional pair of secondary piston-heads 32a" requires an additional force to maintain the predetermined design pressure for the fluid being pressurized. This additional force comes from the forced additional submergence of the float 18, which then forces the capture of the increased energy that is available as incident wave amplitudes increase.

Thus in general terms, the piston rod assembly 28a is connected to urge a subset of the plurality of piston-heads 32a to traverse in response to the kinetic energy of waves incident on the float 18, wherein membership of the subset at any instance is a function of the energy being converted. This function may be implemented as function of the extension of the piston rod assembly 28a. Broadly speaking, the function provides that the aggregate piston head area of the subset increases as the extension of the piston rod assembly increases. As implemented here, the function is discontinuous. More specifically to the present embodiment, the aggregate piston-head area of the subset increases as a result of the membership of the subset gaining an increased number of the plurality of piston-heads 32a as the piston rod assembly 28a extends.

Second Embodiment Energy Accumulator

FIG. 5 shows the second embodiment energy accumulator 16b—a telescopic hydraulic embodiment. Under the urging of the float 18, the variable energy piston assembly 26b operates as follows.

As the amplitude of waves incident upon the float 18 increases, the float 18 will submerge to an increasing depth and its cross-sectional area at the water surface WS will increase. The float 18 may be configured such that the calculated pressure desired to operate the energy accumulator 16b will be relatively constant.

The float 18 extends the piston rod assembly 28b as it submerges. For sufficient submergence of the float 18, the piston rod assembly 28b urges the core 32b' of the telescopic piston-head 32b to traverse the full length of the core cavity 30b' of the telescopic cylinder 30b.

Further submergence of the float 18, with the related increased buoyant force, will cause the core 32b' to travel further, and upon engagement with the medial interior flange 40b'', to drag with it the medial annulus 32b'' and the core cavity 30b' into the medial cavity 30b''. Similarly, still further submergence of the float 18, with the related increased buoyant force, will cause the core 32b', the medial annulus 32b'' and the core cavity 30b' to travel further, and upon engagement with the extreme interior flange 40b''', to drag with them the extreme annulus 32b''' and the medial cavity 30b'' into the extreme cavity 30b'''.

The pressure desired, which is the buoyant force/piston area, will again remain at the calculated value, while the volume increases. The increase in volume compressed or pressurized is a function of the increased buoyant force enlisted in the energy capture.

As the amplitude of waves incident on the float 18 increases further, this second embodiment of the energy accumulator 16b will seek to harness the complete range of available energy by utilizing minimal piston stroke in calm sea conditions with low energy waves and engaging a longer piston stroke with increased diameter piston-head diameter with agitated high-energy waves.

As the float 18 is gradually submerged, it urges the piston rod assembly 28b to extend such that the telescopic piston-head 32b exerts increasing pressure in the telescopic cylinder 30b with minimal piston movement, because the liquid within is substantially incompressible. When the selected and designed threshold pressure is reached, at a selected distance of submergence of the surface float 18, the outlet check-valves 38b open. Further submergence, and/or rising of the float 18 will similarly urge the telescopic piston-head 32b to force the discharge of pressurized fluid from the telescopic cylinder 30b into the intermediate-pressure chamber 24b. It will be noted that the threshold pressure, and any pressure for that matter, is identical throughout the cylinder. The threshold pressure is a determination of the buoyant force applied to the float 18 divided by the area of the core 32b' of the telescopic piston-head 32b.

The mechanically controlled pressure-relief valve 39b is closed whenever compression or transfer of the fluid is in progress. However, once the piston rod assembly 28b just begins to retract, the controlled pressure-relief valve 39b is toggled to the open position in response. The controlled pressure-relief valve 39b is needed because liquid is substantially incompressible and so the liquid inside the low-pressure chamber 22b must be displaced for the telescopic cylinder 30b to recharge. However, the inlet check-valves 36b in the telescopic cylinder 30b that would allow that liquid to be displaced into the telescopic cylinder 30b to recharge it cannot open until the pressure of the liquid inside the telescopic cylinder 30b is less than or equal to the pressure of the liquid inside the low-pressure chamber 22b. The opening of the controlled pressure-relief valve 39b equalizes the pressure of the liquids inside the telescopic cylinder 30b and the low-pressure chamber 22b, so that the inlet check-valves 36b can open and the telescopic cylinder 30b recharge with liquid displaced from the low-pressure chamber 22b as it expands. It will also be appreciated that the pressure equalization will also cause the outlet check-valves 38b to close.

Thus, as the float 18 starts to drop, and the telescopic piston-head 32b starts to move in the recharge direction, all the inlet check-valves 36b will open to facilitate recharging the telescopic cylinder 30b with minimal resistance. If the pressures above were not equalized by the controlled pressure-relief valve 39b, the float 18 would have to drop to the point of first submergence, the position that established the initial working pressure of the telescopic cylinder 30b, before the pressure in the cylinder reduced sufficiently to allow the inlet check-valves 36b to open. The controlled pressure-relief valve 39b thus facilitates recharging for the entire downward movement of the float 18, and such downward movement is not unnecessarily hung-up or retarded. Similar mechanics can be advantageously employed in the first embodiment energy accumulator 16a, but have been omitted for clarity of illustrations.

Thus in general terms, the piston rod assembly 28b is connected to urge a subset of the plurality of piston-heads 32b to traverse in response to the kinetic energy of waves incident on the float 18, wherein membership of the subset at any instance is a function of the energy being converted. This function may be implemented as function of the extension of the piston rod assembly 28b. Broadly speaking, the function provides that the aggregate piston head area of the subset increases as the extension of the piston rod assembly 28b increases. As implemented here, the function is discontinuous. More specifically to the present embodiment, the aggregate piston-head area of the subset increases as a result of at least one member of the subset increasing in area as the piston rod assembly 28b extends.

Third Embodiment Energy Accumulator

FIG. 6 shows the third embodiment of the energy accumulator 16c—an alternate telescopic hydraulic embodiment that operates quite similarly to the second embodiment energy accumulator 16b just described.

One key difference is that the telescopic cylinder 30c, being housed within the gas-filled low-resistance chamber 42c instead of the liquid filled low-pressure chamber 22b, can expand essentially freely by compressing the ambient gas instead of having to displace a substantially incompressible liquid. This arrangement removes the need for the controlled pressure-relief valve 39b.

Another key difference is that the low-pressure fluid flows by gravity feed from the low-pressure chamber 22c downward into the telescopic cylinder 30c, providing a more efficient flow.

Fourth Embodiment Energy Accumulator

FIG. 7 shows the fourth embodiment of the energy accumulator 16d—a multi-piston pneumatic embodiment that operates reasonably similarly to first embodiment multi-piston hydraulic embodiment energy accumulator 16a described above.

A conventional piston does not lend itself to efficient compression of a gas. For large pressure increases, piston-head travel approaches the length of the cylinder to reach the threshold pressure. If this pressure or length of stroke is not reached, no transfer of gas takes place and the compressed gas in the cylinder re-expands as the piston retreats. This non-transfer represents frequent and considerable lost opportunities.

With this challenge in mind, the fourth embodiment of the energy accumulator 16d operates so as to reduce such lost transfer opportunities while taking advantage of opportunities to extract extra energy from larger waves.

Thus in calm sea conditions, only the primary cylinder 30d' will operate, the primary piston-head 32d' working between the fully charged position and an intermediate position along its traverse. The compression phase occurs along a short initial part of this traverse and the transfer phase takes place along the rest of the traverse through to the intermediate position.

As sea conditions become somewhat more energetic and the waves incident on the float 18 have larger amplitudes, the primary piston-head 32d' traverses further—thus extending its transfer phase—and a first pair of secondary piston-heads 32d" (pair #2) is engaged by the piston rod assembly 28d and operate between the fully charged position and an intermediate position along their traverse. Similarly, the compression phase of the first pair of secondary piston-heads 32d" (pair #2)occurs along a short initial part of their traverse and the transfer phase takes place along the rest of their traverse through to the intermediate position.

As sea conditions become further energized and the waves incident on the float 18 have even larger amplitudes, the primary piston-head 32a' and the first pair of secondary piston-heads 32d" (pair #2) traverse further—thus extending their transfer phases—and a second pair of secondary piston-heads 32d" (pair #3) is engaged by the piston rod assembly 28d and operate between the fully charged position and an intermediate position along their traverse. Similarly, the compression phase of the second pair of secondary piston-heads 32d" (pair #3) occurs along a short initial part of their traverse and the transfer phase takes place along the rest of their traverse through to the intermediate position.

Finally, with heavy seas and the waves incident on the float 18 having still larger amplitudes, the primary piston-head 32d' travels to the end of its traverse and the first and second pairs of secondary piston-heads 32d" (pairs #2 and #3) traverse further—thus all extending their transfer phases—and a third pair of secondary piston-heads 32d" (pair #4) is engaged by the piston rod assembly 28d and operate between the fully charged position and an intermediate position along their traverse. Similarly, the compression phase of the third pair of secondary piston-heads 32d" (pair #4) occurs along a short initial part of their traverse and the transfer phase takes place along the rest of their traverse through to the intermediate position.

The primary cylinder 30d' and secondary cylinders 30d" are recharged in the same sequence as they are pressed into duty.

Fifth Embodiment Energy Accumulator

FIG. 8 shows the fifth embodiment of the energy accumulator 16e—a telescopic piston pneumatic embodiment that operates reasonably similarly to second embodiment telescopic hydraulic embodiment energy accumulator 16b described above.

Energy capture in pneumatic systems increases in efficiency and capacity as the pressure increase provided by each cavity or cylinder in series decreases. That is, a pressure-increase of 50% yields higher energy capture than a pressure increase of 100% because of a shorter compression stroke. The fifth embodiment of the energy accumulator 16e operates with this arrangement in mind.

In calm seas, operation is limited to the first telescopic cylinder 30e-1, which includes several consecutive telescopic cavities 30e'-1, 30e"-1, 30e'"-1 and a cooperating first telescopic piston-head 32e-1 of increasing diameter.

The pressure for this first telescopic cylinder 30e-1 is determined by the buoyant force, (which is a function of the amount of submergence of the float 18), divided by the area of that one of the telescopic cavities 30e'-1, 30e"-1, 30e'"-1 currently being occupied by the first telescopic piston-head 32e-1. This determination follows the selection of the pressure increase that we wish to achieve. Successive telescopic cavities 30e"-1, 30e'"-1 feature increased diameters to force greater submergence of the float 18 as the stroke of the piston rod assembly 28e increases. Such increased diameters demand more buoyant forces to maintain the design pressure increase. The physical parameters of the first telescopic cylinder 30e-1 can be selected to be compatible with calm sea conditions of say up to 1.5m.

As the wave regime increases above 1.5m and perhaps up to 3m, the pneumatic system requires a longer piston to properly harness the increased energy. The increased wave amplitude necessarily will demand a longer piston stroke. A second telescopic cylinder 30e-2 satisfies this need as an add-on cylinder. The second telescopic cylinder 30e-2 also functions as an add-on piston by virtue of its design. The second telescopic cylinder 30e-2 remains independent of its neighbours so long as the pressure of the gas within it keeps the first telescopic piston-head 32e-1 from entering, and so long as the latching assembly 44:1-2 between them remains latched.

When the stroke of the first telescopic piston-head 32e-1 exceeds the length of the first telescopic cylinder 30e-1 and thus enters the second telescopic cylinder 30e-2, the latching assembly 44:1-2 between them is released and the second telescopic piston-head 32e-2 is activated. The second telescopic piston-head 32e-2 will thus have the ability to act as a continuation of the stroke.

For this wave regime, the active cylinder becomes the first telescopic cylinder 30e-1 plus the second telescopic cylinder 30e-2. For example, if, at the outset, our selection for pressure increase was 100%, then the threshold pressure will be achieved at the point of the stroke where the combined volume is halved. Continuous operation in this wave regime will see both cylinders recharge after the wave peak has passed. However, recharging of the second telescopic cylinder 30e-2 will be in proportion to its "lost opportunity".

This process extends for even higher wave regimes. A third telescopic cylinder 30e-3 satisfies this need as another add-on cylinder. The third telescopic cylinder 30e-3 also functions as an add-on piston by virtue of its design. The third telescopic cylinder 30e-3 remains independent of its neighbours so long as the pressure of the gas within it keeps the second telescopic piston-head 32e-2 from entering, and so long as the latching assembly 44:2-3 between them remains latched.

When the stroke of the second telescopic piston-head 32e-2 exceeds the length of the second telescopic cylinder 30e-2 and thus enters the third telescopic cylinder 30e-3, the latching assembly 44:2-3 between them is released and the third telescopic piston-head 32-e3 is activated. The third telescopic piston-head 32e-3 will thus have the ability to act as a continuation of the stroke.

For this higher wave regime, the active cylinder becomes first telescopic cylinder 30e-1 plus the second telescopic cylinder 30e-2 plus the third telescopic cylinder 30e-3. For example, if at the outset our selection for pressure increase was 100%, then the threshold pressure will be achieved at the point of the stroke where the combined volume is halved.

Continuous operation in this wave regime will see all three cylinders recharge after the wave peak has passed. However, recharging of the third telescopic cylinder 30e-3 will be in proportion to its "lost opportunity".

This sequence would continue for subsequent cylinders in the design.

Thus in general terms, the piston rod assembly 28e is connected to urge a subset of the plurality of piston-heads 32e to traverse in response to the kinetic energy of waves incident on the float 18, wherein membership of the subset at any instance is a function of the energy being converted. This function may be implemented as function of the extension of the piston rod assembly 28e. Broadly speaking, the function provides that the aggregate piston head area of the subset increases as the extension of the piston rod assembly 28e increases. As implemented here, the function is discontinuous. More specifically to the present embodiment, the aggregate piston-head area of the subset increases as a result of the membership of the subset gaining larger-area ones of the plurality of piston-heads 32e as the piston rod assembly 28e extends.

(c) Description Summary

Thus, it will be seen from the foregoing embodiments and examples that there has been described a way to adapt a piston and float to the actual amplitude of incident waves so as to improve the efficiency of energy conversion.

While specific embodiments of the invention have been described and illustrated, such embodiments should be considered illustrative of the invention only and not as limiting the invention as construed in accordance with the accompanying claims. In particular, all quantities described have been determined empirically and those skilled in the art might well expect a wide range of values surrounding those described to provide similarly beneficial results.

It will be understood by those skilled in the art that various changes, modifications and substitutions can be made to the foregoing embodiments without departing from the principle and scope of the invention expressed in the claims made herein.

For example, the low pressure and intermediate-pressure chambers can be interchanged end-for-end, if desired, and result in corresponding inversions of the pumping mechanisms and valving arrangements.

While the invention has been described as having particular application for energy generation, those skilled in the art will recognize it has wider application.

TABLE OF REFERENCES

| Element(s) | Reference | Total count | Page and line |
|---|---|---|---|
| wave transducer | 10 | 2 | Page 11 line 21 |
| | | | Page 21 line 12 |
| platform | 12 | 5 | Page 11 line 21 |
| | | | Page 11 line 23 |
| | | | Page 11 line 27 |
| | | | Page 12 line 9 |
| | | | Page 21 line 15 |
| platforms | 12 | 1 | Page 12 line 9 |
| high-pressure reservoir | 14 | 3 | Page 11 line 22 |
| | | | Page 12 line 7 |
| | | | Page 21 line 26 |
| energy accumulator | 16 | 30 | Page 11 line 22 |
| | | | Page 11 line 24 |
| | | | Page 11 line 27 |
| | | | Page 12 line 1 |
| | | | Page 12 line 4 |
| | | | Page 12 line 6 |
| | | | Page 12 line 8 |
| | | | Page 12 line 16 |
| | | | Page 12 line 21 |
| | | | Page 12 line 27 |
| | | | Page 15 line 21 |
| | | | Page 16 line 26 |
| | | | Page 17 line 25 |
| | | | Page 18 line 16 |
| | | | Page 18 line 17 |
| | | | Page 18 line 19 |
| | | | Page 21 line 22 |
| | | | Page 22 line 16 |
| | | | Page 24 line 6 |
| | | | Page 24 line 12 |
| | | | Page 25 line 2 |
| | | | Page 26 line 13 |
| | | | Page 26 line 27 |
| | | | Page 26 line 29 |
| | | | Page 27 line 10 |
| | | | Page 27 line 12 |
| | | | Page 27 line 20 |
| | | | Page 29 line 4 |
| | | | Page 29 line 6 |
| | | | Page 29 line 12 |
| energy accumulators | 16 | 1 | Page 21 line 25 |
| energy accumulator | 16a | 4 | Page 15 line 21 |
| | | | Page 22 line 16 |
| | | | Page 26 line 13 |
| | | | Page 27 line 12 |
| energy accumulator | 16b | 8 | Page 16 line 26 |
| | | | Page 17 line 25 |
| | | | Page 18 line 17 |
| | | | Page 24 line 6 |
| | | | Page 24 line 12 |
| | | | Page 25 line 2 |
| | | | Page 26 line 29 |
| | | | Page 29 line 6 |
| energy accumulator | 16c | 3 | Page 18 line 16 |
| | | | Page 18 line 19 |
| | | | Page 26 line 27 |
| energy accumulator | 16d | 2 | Page 27 line 10 |
| | | | Page 27 line 20 |
| energy accumulator | 16e | 2 | Page 29 line 4 |
| | | | Page 29 line 12 |
| float | 18 | 64 | Page 11 line 23 |
| | | | Page 11 line 25 |
| | | | Page 12 line 1 |
| | | | Page 12 line 2 |
| | | | Page 12 line 3 |
| | | | Page 12 line 4 |
| | | | Page 12 line 21 |
| | | | Page 12 line 24 |
| | | | Page 12 line 24 |
| | | | Page 14 line 14 |
| | | | Page 14 line 21 |
| | | | Page 14 line 24 |
| | | | Page 15 line 2 |
| | | | Page 15 line 3 |
| | | | Page 15 line 6 |
| | | | Page 15 line 8 |
| | | | Page 15 line 9 |
| | | | Page 15 line 9 |
| | | | Page 15 line 11 |
| | | | Page 15 line 13 |
| | | | Page 15 line 14 |
| | | | Page 17 line 25 |
| | | | Page 19 line 22 |
| | | | Page 20 line 11 |
| | | | Page 21 line 9 |
| | | | Page 21 line 18 |
| | | | Page 21 line 20 |
| | | | Page 21 line 21 |
| | | | Page 22 line 2 |
| | | | Page 22 line 3 |

-continued

| Element(s) | Reference | Total count | Page and line |
|---|---|---|---|
| | | | Page 22 line 5 |
| | | | Page 22 line 8 |
| | | | Page 22 line 10 |
| | | | Page 22 line 12 |
| | | | Page 22 line 17 |
| | | | Page 22 line 23 |
| | | | Page 22 line 27 |
| | | | Page 23 line 5 |
| | | | Page 23 line 9 |
| | | | Page 23 line 20 |
| | | | Page 23 line 24 |
| | | | Page 24 line 7 |
| | | | Page 24 line 9 |
| | | | Page 24 line 9 |
| | | | Page 24 line 11 |
| | | | Page 24 line 14 |
| | | | Page 24 line 15 |
| | | | Page 24 line 18 |
| | | | Page 24 line 22 |
| | | | Page 25 line 1 |
| | | | Page 25 line 6 |
| | | | Page 25 line 11 |
| | | | Page 25 line 12 |
| | | | Page 25 line 16 |
| | | | Page 26 line 3 |
| | | | Page 26 line 7 |
| | | | Page 26 line 11 |
| | | | Page 26 line 17 |
| | | | Page 28 line 2 |
| | | | Page 28 line 11 |
| | | | Page 28 line 20 |
| | | | Page 29 line 18 |
| | | | Page 29 line 23 |
| | | | Page 31 line 16 |
| weights | 20 | 2 | Page 11 line 24 |
| | | | Page 21 line 16 |
| low-pressure chamber | 22 | 22 | Page 12 line 16 |
| | | | Page 12 line 20 |
| | | | Page 15 line 21 |
| | | | Page 15 line 23 |
| | | | Page 15 line 25 |
| | | | Page 16 line 4 |
| | | | Page 16 line 6 |
| | | | Page 16 line 26 |
| | | | Page 17 line 3 |
| | | | Page 17 line 18 |
| | | | Page 17 line 28 |
| | | | Page 18 line 20 |
| | | | Page 18 line 21 |
| | | | Page 18 line 27 |
| | | | Page 20 line 18 |
| | | | Page 21 line 24 |
| | | | Page 25 line 23 |
| | | | Page 25 line 28 |
| | | | Page 25 line 30 |
| | | | Page 26 line 31 |
| | | | Page 27 line 2 |
| | | | Page 27 line 7 |
| low-pressure chamber | 22a | 5 | Page 15 line 21 |
| | | | Page 15 line 23 |
| | | | Page 15 line 25 |
| | | | Page 16 line 4 |
| | | | Page 16 line 6 |
| low-pressure chamber | 22b | 9 | Page 16 line 26 |
| | | | Page 17 line 3 |
| | | | Page 17 line 18 |
| | | | Page 17 line 28 |
| | | | Page 25 line 23 |
| | | | Page 25 line 28 |
| | | | Page 25 line 30 |
| | | | Page 26 line 31 |
| | | | Page 27 line 2 |
| low-pressure chamber | 22c | 4 | Page 18 line 20 |
| | | | Page 18 line 21 |
| | | | Page 18 line 27 |
| | | | Page 27 line 7 |

-continued

| Element(s) | Reference | Total count | Page and line |
|---|---|---|---|
| low-pressure chamber | 22e | 1 | Page 20 line 18 |
| intermediate-pressure chamber | 24 | 16 | Page 12 line 17 |
| | | | Page 12 line 19 |
| | | | Page 12 line 24 |
| | | | Page 15 line 22 |
| | | | Page 15 line 23 |
| | | | Page 16 line 5 |
| | | | Page 16 line 7 |
| | | | Page 16 line 27 |
| | | | Page 17 line 4 |
| | | | Page 17 line 21 |
| | | | Page 17 line 24 |
| | | | Page 18 line 19 |
| | | | Page 18 line 22 |
| | | | Page 20 line 19 |
| | | | Page 21 line 25 |
| | | | Page 25 line 14 |
| intermediate-pressure chamber | 24a | 4 | Page 15 line 22 |
| | | | Page 15 line 23 |
| | | | Page 16 line 5 |
| | | | Page 16 line 7 |
| intermediate-pressure chamber | 24b | 5 | Page 16 line 27 |
| | | | Page 17 line 4 |
| | | | Page 17 line 21 |
| | | | Page 17 line 24 |
| | | | Page 25 line 14 |
| intermediate-pressure chamber | 24c | 2 | Page 18 line 19 |
| | | | Page 18 line 22 |
| intermediate-pressure chamber | 24e | 1 | Page 20 line 19 |
| variable energy piston assembly | 26 | 12 | Page 12 line 19 |
| | | | Page 13 line 3 |
| | | | Page 13 line 6 |
| | | | Page 13 line 9 |
| | | | Page 15 line 14 |
| | | | Page 16 line 11 |
| | | | Page 17 line 1 |
| | | | Page 19 line 20 |
| | | | Page 21 line 19 |
| | | | Page 21 line 23 |
| | | | Page 22 line 17 |
| | | | Page 24 line 7 |
| variable energy piston assembly | 26a | 2 | Page 16 line 11 |
| | | | Page 22 line 17 |
| variable energy piston assembly | 26b | 2 | Page 17 line 1 |
| | | | Page 24 line 7 |
| variable energy piston assembly | 26d | 1 | Page 19 line 20 |
| piston rod assembly | 28 | 38 | Page 12 line 22 |
| | | | Page 12 line 22 |
| | | | Page 12 line 23 |
| | | | Page 12 line 25 |
| | | | Page 13 line 17 |
| | | | Page 15 line 9 |
| | | | Page 15 line 13 |
| | | | Page 16 line 10 |
| | | | Page 16 line 12 |
| | | | Page 16 line 15 |
| | | | Page 17 line 22 |
| | | | Page 18 line 1 |
| | | | Page 18 line 3 |
| | | | Page 21 line 2 |
| | | | Page 21 line 18 |
| | | | Page 21 line 21 |
| | | | Page 22 line 25 |
| | | | Page 23 line 8 |
| | | | Page 23 line 16 |
| | | | Page 23 line 22 |
| | | | Page 23 line 26 |
| | | | Page 24 line 3 |
| | | | Page 24 line 14 |
| | | | Page 24 line 15 |
| | | | Page 25 line 6 |
| | | | Page 25 line 19 |
| | | | Page 26 line 15 |
| | | | Page 26 line 19 |
| | | | Page 26 line 21 |

-continued

| Element(s) | Reference | Total count | Page and line |
|---|---|---|---|
| | | | Page 26 line 25 |
| | | | Page 28 line 4 |
| | | | Page 28 line 14 |
| | | | Page 28 line 24 |
| | | | Page 29 line 24 |
| | | | Page 31 line 14 |
| | | | Page 31 line 18 |
| | | | Page 31 line 20 |
| | | | Page 31 line 24 |
| piston rod assembly | 28a | 9 | Page 16 line 10 |
| | | | Page 16 line 12 |
| | | | Page 16 line 15 |
| | | | Page 22 line 25 |
| | | | Page 23 line 8 |
| | | | Page 23 line 16 |
| | | | Page 23 line 22 |
| | | | Page 23 line 26 |
| | | | Page 24 line 3 |
| piston rod assembly | 28b | 11 | Page 17 line 22 |
| | | | Page 18 line 1 |
| | | | Page 18 line 3 |
| | | | Page 24 line 14 |
| | | | Page 24 line 15 |
| | | | Page 25 line 6 |
| | | | Page 25 line 19 |
| | | | Page 26 line 15 |
| | | | Page 26 line 19 |
| | | | Page 26 line 21 |
| | | | Page 26 line 25 |
| piston rod assembly | 28d | 3 | Page 28 line 4 |
| | | | Page 28 line 14 |
| | | | Page 28 line 24 |
| piston rod assembly | 28e | 6 | Page 21 line 2 |
| | | | Page 29 line 24 |
| | | | Page 31 line 14 |
| | | | Page 31 line 18 |
| | | | Page 31 line 20 |
| | | | Page 31 line 24 |
| cylinder | 30 | 57 | Page 15 line 26 |
| | | | Page 15 line 28 |
| | | | Page 15 line 28 |
| | | | Page 17 line 2 |
| | | | Page 17 line 8 |
| | | | Page 17 line 17 |
| | | | Page 17 line 20 |
| | | | Page 17 line 26 |
| | | | Page 17 line 27 |
| | | | Page 18 line 23 |
| | | | Page 18 line 24 |
| | | | Page 18 line 28 |
| | | | Page 20 line 3 |
| | | | Page 20 line 20 |
| | | | Page 20 line 21 |
| | | | Page 20 line 23 |
| | | | Page 20 line 24 |
| | | | Page 20 line 27 |
| | | | Page 20 line 28 |
| | | | Page 20 line 29 |
| | | | Page 22 line 19 |
| | | | Page 23 line 13 |
| | | | Page 24 line 17 |
| | | | Page 25 line 8 |
| | | | Page 25 line 13 |
| | | | Page 25 line 24 |
| | | | Page 25 line 25 |
| | | | Page 25 line 26 |
| | | | Page 25 line 27 |
| | | | Page 25 line 29 |
| | | | Page 25 line 31 |
| | | | Page 26 line 5 |
| | | | Page 26 line 8 |
| | | | Page 27 line 1 |
| | | | Page 27 line 7 |
| | | | Page 27 line 23 |
| | | | Page 29 line 1 |
| | | | Page 29 line 14 |
| | | | Page 29 line 17 |

-continued

| Element(s) | Reference | Total count | Page and line |
|---|---|---|---|
| | | | Page 29 line 26 |
| | | | Page 30 line 2 |
| | | | Page 30 line 3 |
| | | | Page 30 line 4 |
| | | | Page 30 line 9 |
| | | | Page 30 line 10 |
| | | | Page 30 line 15 |
| | | | Page 30 line 15 |
| | | | Page 30 line 20 |
| | | | Page 30 line 22 |
| | | | Page 30 line 23 |
| | | | Page 30 line 24 |
| | | | Page 30 line 29 |
| | | | Page 31 line 1 |
| | | | Page 31 line 6 |
| | | | Page 31 line 6 |
| | | | Page 31 line 7 |
| | | | Page 31 line 11 |
| cylinders | 30 | 12 | Page 13 line 11 |
| | | | Page 13 line 15 |
| | | | Page 15 line 27 |
| | | | Page 16 line 1 |
| | | | Page 16 line 3 |
| | | | Page 16 line 6 |
| | | | Page 16 line 19 |
| | | | Page 16 line 21 |
| | | | Page 20 line 18 |
| | | | Page 20 line 25 |
| | | | Page 23 line 13 |
| | | | Page 29 line 1 |
| cylinders | 30a | 7 | Page 15 line 27 |
| | | | Page 16 line 1 |
| | | | Page 16 line 3 |
| | | | Page 16 line 6 |
| | | | Page 16 line 19 |
| | | | Page 16 line 21 |
| | | | Page 23 line 13 |
| primary cylinder | 30a' | 5 | Page 15 line 26 |
| | | | Page 15 line 28 |
| | | | Page 15 line 28 |
| | | | Page 22 line 19 |
| | | | Page 23 line 13 |
| secondary cylinders | 30a" | 5 | Page 15 line 27 |
| | | | Page 16 line 1 |
| | | | Page 16 line 19 |
| | | | Page 16 line 21 |
| | | | Page 23 line 13 |
| telescopic cylinder | 30b | 17 | Page 17 line 2 |
| | | | Page 17 line 8 |
| | | | Page 17 line 17 |
| | | | Page 17 line 19 |
| | | | Page 17 line 26 |
| | | | Page 17 line 27 |
| | | | Page 24 line 17 |
| | | | Page 25 line 8 |
| | | | Page 25 line 13 |
| | | | Page 25 line 23 |
| | | | Page 25 line 24 |
| | | | Page 25 line 25 |
| | | | Page 25 line 27 |
| | | | Page 25 line 29 |
| | | | Page 25 line 31 |
| | | | Page 26 line 5 |
| | | | Page 26 line 8 |
| core cavity | 30b' | 6 | Page 17 line 8 |
| | | | Page 17 line 9 |
| | | | Page 17 line 18 |
| | | | Page 24 line 16 |
| | | | Page 24 line 20 |
| | | | Page 24 line 23 |
| medial cavity | 30b" | 5 | Page 17 line 9 |
| | | | Page 17 line 11 |
| | | | Page 17 line 19 |
| | | | Page 24 line 21 |
| | | | Page 24 line 25 |

-continued

| Element(s) | Reference | Total count | Page and line |
|---|---|---|---|
| extreme cavity | 30b''' | 3 | Page 17 line 11 |
|  |  |  | Page 17 line 19 |
|  |  |  | Page 24 line 25 |
| telescopic cylinder | 30c | 5 | Page 18 line 22 |
|  |  |  | Page 18 line 24 |
|  |  |  | Page 18 line 28 |
|  |  |  | Page 27 line 1 |
|  |  |  | Page 27 line 7 |
| primary cylinder | 30d' | 2 | Page 27 line 23 |
|  |  |  | Page 29 line 1 |
| telescopic cylinder | 30e | 28 | Page 20 line 3 |
|  |  |  | Page 20 line 20 |
|  |  |  | Page 20 line 21 |
|  |  |  | Page 20 line 22 |
|  |  |  | Page 20 line 23 |
|  |  |  | Page 20 line 27 |
|  |  |  | Page 20 line 28 |
|  |  |  | Page 20 line 29 |
|  |  |  | Page 29 line 14 |
|  |  |  | Page 29 line 17 |
|  |  |  | Page 29 line 26 |
|  |  |  | Page 30 line 2 |
|  |  |  | Page 30 line 3 |
|  |  |  | Page 30 line 4 |
|  |  |  | Page 30 line 9 |
|  |  |  | Page 30 line 10 |
|  |  |  | Page 30 line 14 |
|  |  |  | Page 30 line 15 |
|  |  |  | Page 30 line 20 |
|  |  |  | Page 30 line 21 |
|  |  |  | Page 30 line 23 |
|  |  |  | Page 30 line 24 |
|  |  |  | Page 30 line 29 |
|  |  |  | Page 31 line 1 |
|  |  |  | Page 31 line 5 |
|  |  |  | Page 31 line 6 |
|  |  |  | Page 31 line 6 |
|  |  |  | Page 31 line 11 |
| telescopic cylinders | 30e | 2 | Page 20 line 18 |
|  |  |  | Page 20 line 25 |
| core cavity | 30e' | 1 | Page 20 line 4 |
| medial cavity | 30e'' | 1 | Page 20 line 4 |
| extreme cavity | 30e''' | 1 | Page 20 line 5 |
| first telescopic cylinder | 30e-1 | 6 | Page 29 line 14 |
|  |  |  | Page 29 line 17 |
|  |  |  | Page 29 line 26 |
|  |  |  | Page 30 line 9 |
|  |  |  | Page 30 line 14 |
|  |  |  | Page 31 line 5 |
| cavities | 30e'-1, 30e''-1, 30e'''-1 | 2 | Page 29 line 15 |
|  |  |  | Page 29 line 19 |
| second telescopic cylinder | 30e-2 | 8 | Page 30 line 2 |
|  |  |  | Page 30 line 3 |
|  |  |  | Page 30 line 4 |
|  |  |  | Page 30 line 9 |
|  |  |  | Page 30 line 15 |
|  |  |  | Page 30 line 19 |
|  |  |  | Page 30 line 29 |
|  |  |  | Page 31 line 6 |
| third telescopic cylinder | 30e-3 | 6 | Page 30 line 21 |
|  |  |  | Page 30 line 22 |
|  |  |  | Page 30 line 24 |
|  |  |  | Page 31 line 29 |
|  |  |  | Page 31 line 6 |
|  |  |  | Page 31 line 11 |
| piston-heads | 32 | 27 | Page 13 line 14 |
|  |  |  | Page 13 line 18 |
|  |  |  | Page 16 line 2 |
|  |  |  | Page 16 line 10 |
|  |  |  | Page 16 line 13 |
|  |  |  | Page 16 line 16 |
|  |  |  | Page 20 line 10 |
|  |  |  | Page 21 line 3 |
|  |  |  | Page 22 line 25 |
|  |  |  | Page 23 line 6 |
|  |  |  | Page 23 line 7 |
|  |  |  | Page 23 line 11 |
|  |  |  | Page 23 line 16 |
|  |  |  | Page 23 line 17 |
|  |  |  | Page 23 line 23 |
|  |  |  | Page 24 line 3 |
|  |  |  | Page 26 line 16 |
|  |  |  | Page 28 line 4 |
|  |  |  | Page 28 line 7 |
|  |  |  | Page 28 line 12 |
|  |  |  | Page 28 line 13 |
|  |  |  | Page 28 line 16 |
|  |  |  | Page 28 line 22 |
|  |  |  | Page 28 line 24 |
|  |  |  | Page 28 line 27 |
|  |  |  | Page 31 line 15 |
|  |  |  | Page 31 line 24 |
| piston-heads | 32a | 12 | Page 16 line 2 |
|  |  |  | Page 16 line 10 |
|  |  |  | Page 16 line 13 |
|  |  |  | Page 16 line 16 |
|  |  |  | Page 22 line 25 |
|  |  |  | Page 23 line 6 |
|  |  |  | Page 23 line 7 |
|  |  |  | Page 23 line 11 |
|  |  |  | Page 23 line 16 |
|  |  |  | Page 23 line 17 |
|  |  |  | Page 23 line 23 |
|  |  |  | Page 24 line 3 |
| primary piston-head | 32a' | 9 | Page 16 line 28 |
|  |  |  | Page 16 line 14 |
|  |  |  | Page 16 line 17 |
|  |  |  | Page 22 line 20 |
|  |  |  | Page 22 line 23 |
|  |  |  | Page 23 line 5 |
|  |  |  | Page 23 line 10 |
|  |  |  | Page 23 line 15 |
|  |  |  | Page 28 line 11 |
| secondary piston-heads | 32a'' | 9 | Page 16 line 1 |
|  |  |  | Page 16 line 13 |
|  |  |  | Page 16 line 16 |
|  |  |  | Page 22 line 24 |
|  |  |  | Page 23 line 6 |
|  |  |  | Page 23 line 7 |
|  |  |  | Page 23 line 11 |
|  |  |  | Page 23 line 16 |
|  |  |  | Page 23 line 17 |
| telescopic piston-head | 32b | 7 | Page 17 line 4 |
|  |  |  | Page 17 line 5 |
|  |  |  | Page 24 line 16 |
|  |  |  | Page 25 line 7 |
|  |  |  | Page 25 line 12 |
|  |  |  | Page 25 line 17 |
|  |  |  | Page 26 line 3 |
| piston-heads | 32b | 1 | Page 26 line 16 |
| core | 32b' | 11 | Page 17 line 5 |
|  |  |  | Page 17 line 6 |
|  |  |  | Page 17 line 9 |
|  |  |  | Page 17 line 13 |
|  |  |  | Page 17 line 15 |
|  |  |  | Page 17 line 22 |
|  |  |  | Page 18 line 5 |
|  |  |  | Page 24 line 16 |
|  |  |  | Page 24 line 19 |
|  |  |  | Page 24 line 22 |
|  |  |  | Page 25 line 17 |
| medial annulus | 32b'' | 10 | Page 17 line 5 |
|  |  |  | Page 17 line 7 |
|  |  |  | Page 17 line 10 |
|  |  |  | Page 17 line 13 |
|  |  |  | Page 17 line 15 |
|  |  |  | Page 17 line 23 |
|  |  |  | Page 18 line 4 |
|  |  |  | Page 18 line 7 |
|  |  |  | Page 24 line 20 |
|  |  |  | Page 24 line 23 |
| extreme annulus | 32b''' | 5 | Page 17 line 6 |
|  |  |  | Page 17 line 12 |
|  |  |  | Page 17 line 15 |

-continued

| Element(s) | Reference | Total count | Page and line |
|---|---|---|---|
| | | | Page 18 line 5 |
| | | | Page 24 line 25 |
| telescopic piston-head | 32c | 1 | Page 19 line 3 |
| piston-head | 32d | 3 | Page 27 line 24 |
| | | | Page 28 line 2 |
| | | | Page 28 line 21 |
| primary piston-head | 32d' | 3 | Page 27 line 24 |
| | | | Page 28 line 2 |
| | | | Page 28 line 21 |
| secondary piston-heads | 32d" | 8 | Page 28 line 4 |
| | | | Page 28 line 7 |
| | | | Page 28 line 12 |
| | | | Page 28 line 13 |
| | | | Page 28 line 16 |
| | | | Page 28 line 22 |
| | | | Page 28 line 24 |
| | | | Page 28 line 27 |
| piston-heads | 32e | 4 | Page 20 line 10 |
| | | | Page 21 line 3 |
| | | | Page 31 line 15 |
| | | | Page 31 line 24 |
| telescopic piston-head | 32e | 11 | Page 20 line 26 |
| | | | Page 20 line 27 |
| | | | Page 29 line 16 |
| | | | Page 29 line 20 |
| | | | Page 30 line 6 |
| | | | Page 30 line 8 |
| | | | Page 30 line 11 |
| | | | Page 30 line 12 |
| | | | Page 30 line 26 |
| | | | Page 30 line 28 |
| | | | Page 31 line 3 |
| first telescopic piston-head | 32e-1 | 4 | Page 29 line 16 |
| | | | Page 29 line 20 |
| | | | Page 30 line 6 |
| | | | Page 30 line 8 |
| second telescopic piston-head | 32e-2 | 4 | Page 30 line 11 |
| | | | Page 30 line 11 |
| | | | Page 30 line 25 |
| | | | Page 30 line 28 |
| third telescopic piston-head | 32-e3 | 1 | Page 31 line 2 |
| bulkhead | 34 | 5 | Page 15 line 22 |
| | | | Page 16 line 7 |
| | | | Page 16 line 8 |
| | | | Page 16 line 27 |
| | | | Page 17 line 24 |
| bulkhead | 34a | 3 | Page 15 line 22 |
| | | | Page 16 line 7 |
| | | | Page 16 line 8 |
| bulkhead | 34b | 2 | Page 16 line 27 |
| | | | Page 17 line 24 |
| inlet check-valve | 36a | 1 | Page 16 line 3 |
| inlet check-valves | 36b | 5 | Page 17 line 17 |
| | | | Page 25 line 24 |
| | | | Page 25 line 30 |
| | | | Page 26 line 4 |
| | | | Page 26 line 9 |
| inlet check-valves | 36c | 1 | Page 19 line 4 |
| inlet check-valve | 36e | 1 | Page 20 line 23 |
| outlet check-valve | 38a | 2 | Page 16 line 4 |
| | | | Page 16 line 8 |
| outlet check-valves | 38b | 3 | Page 17 line 20 |
| | | | Page 25 line 11 |
| | | | Page 26 line 2 |
| outlet check-valve | 38e | 1 | Page 20 line 22 |
| controlled pressure-relief valve | 39b | 9 | Page 17 line 26 |
| | | | Page 18 line 1 |
| | | | Page 25 line 18 |
| | | | Page 25 line 20 |
| | | | Page 25 line 21 |
| | | | Page 25 line 28 |
| | | | Page 26 line 6 |
| | | | Page 26 line 10 |
| | | | Page 27 line 5 |
| medial interior flange | 40b" | 3 | Page 18 line 4 |
| | | | Page 18 line 7 |
| | | | Page 24 line 20 |
| extreme interior flange | 40b'" | 3 | Page 18 line 6 |
| | | | Page 18 line 8 |
| | | | Page 24 line 24 |
| low-resistance chamber | 42c | 2 | Page 18 line 20 |
| | | | Page 27 line 2 |
| latching assembly | 44 | 5 | Page 20 line 25 |
| | | | Page 30 line 6 |
| | | | Page 30 line 10 |
| | | | Page 30 line 26 |
| | | | Page 31 line 1 |
| latching assembly | 44:1-2 | 2 | Page 30 line 6 |
| | | | Page 30 line 10 |
| latching assembly | 44:2-3 | 2 | Page 30 line 26 |
| | | | Page 31 line 1 |
| water surface | WS | 7 | Page 11 line 23 |
| | | | Page 12 line 3 |
| | | | Page 21 line 13 |
| | | | Page 21 line 16 |
| | | | Page 21 line 18 |
| | | | Page 22 line 10 |
| | | | Page 24 line 10 |

What is claimed is:

1. An apparatus for converting kinetic energy, comprising:
   a) a plurality of cylinders connected to receive a first fluid at a first pressure and to supply the first fluid at a second pressure that is higher than the first pressure;
   b) a plurality of piston-heads, each of the plurality of piston-heads being operable to traverse within a respective one of the plurality of cylinders to receive, pressurize and supply the first fluid; and
   c) a piston rod assembly connected to urge a subset of the plurality of piston-heads to traverse in response to the kinetic energy, wherein the aggregate piston-head area of the members of the subset increases as a function of the energy being converted,
   wherein the plurality of cylinders, the plurality of piston-heads and the piston rod in combination comprise a piston assembly.

2. An apparatus as claimed in claim 1, wherein the function is a function of the extension of the piston rod assembly.

3. An apparatus as claimed in claim 2, wherein the function provides that the aggregate piston-head area of the subset increases as the extension of the piston rod assembly increases.

4. An apparatus as claimed in claim 3, wherein the function is discontinuous.

5. An apparatus as claimed in claim 4, wherein the aggregate piston-head area of the subset increases as a result of the membership of the subset gaining an increased number of the plurality of piston-heads as the piston rod assembly extends.

6. An apparatus as claimed in claim 4, wherein the aggregate piston-head area of the subset increases as a result of the membership of the subset gaining larger-area ones of the plurality of piston-heads as the piston rod assembly extends.

7. An apparatus as claimed in claim 4, wherein the aggregate piston-head area of the subset increases as a result of at least one member of the subset increasing in area as the piston rod assembly extends.

8. An apparatus as claimed in claim 2, further including:
   a) a low-pressure chamber operable to store the first fluid at the first pressure, at least one of the plurality of cylinders being connected to the low-pressure chamber to receive the first fluid at the first pressure; and b) an intermediate-pressure chamber operable to store the first fluid at the second pressure, at least one of the plurality of cylinders being connected to the intermediate-pressure chamber to supply the first fluid at the second pressure, wherein the low-pressure chamber, the intermediate-pressure chamber and the piston assembly in combination comprise an energy accumulator.

9. An apparatus as claimed in claim 8, wherein the low-pressure chamber and the intermediate-pressure chamber abut.

10. An apparatus as claimed in claim 9, wherein the low-pressure chamber and the intermediate-pressure chamber share a common bulkhead.

11. An apparatus as claimed in claim 10, wherein the low-pressure chamber and the intermediate-pressure chamber are integral.

12. An apparatus as claimed in claim 10, wherein:
a) at least one of the plurality of cylinders is connected to the low-pressure chamber via an inlet check-valve configured to permit the low-pressure chamber to supply the first fluid but not receive it; and
b) at least one of the plurality of cylinders is connected to the intermediate-pressure chamber via an outlet check-valve configured to permit the intermediate-pressure chamber to receive the first fluid but not supply it.

13. An apparatus as claimed in claim 12, further including a controlled pressure-relief valve connected between at least one of the plurality of cylinders and the low-pressure chamber and operable to open in response to the retraction of the piston rod assembly regardless of the pressure difference between its ports.

14. An apparatus as claimed in claim 12, wherein at least one of the plurality of cylinders is housed within the low-pressure chamber.

15. An apparatus as claimed in claim 14, wherein the at least one of the plurality of cylinders housed within the low-pressure chamber abuts the bulkhead.

16. An apparatus as claimed in claim 15, wherein the outlet check-valve connects the at least one of the plurality of cylinders housed within the low-pressure chamber to the intermediate-pressure chamber through the bulkhead.

17. An apparatus as claimed in claim 10, wherein the low-pressure chamber jackets the intermediate-pressure chamber.

18. An apparatus as claimed in claim 17, further comprising a low-resistance chamber abutting the low-pressure chamber and the intermediate-pressure chamber.

19. An apparatus as claimed in claim 18, wherein at least one of the plurality of cylinders is housed within the low-resistance chamber.

20. An apparatus as claimed in claim 19, wherein the low-resistance chamber is filled with gas at no greater than the current ambient pressure.

21. An apparatus as claimed in claim 20, wherein the at least one of the plurality of cylinders housed within the low-resistance chamber is telescopic and upon expansion compresses the gas that fills the low-pressure chamber.

22. An apparatus as claimed in claim 21, wherein the low-resistance chamber is below the low-pressure chamber.

23. An apparatus as claimed in claim 22, wherein the at least one of the plurality of cylinders housed within the low-resistance chamber is connected to the low-pressure chamber to receive the first fluid by gravity feed.

24. An apparatus as claimed in claim 8, further including:
a) a platform for supporting the energy accumulator at a predetermined average distance below the surface of a second fluid; and b) a float connected to the piston rod assembly opposite the plurality of piston-heads, the float being operable to float on the second fluid in the path of an incident wave and thereby urge the piston rod assembly to respectively extend and retract in response to the incident wave cresting and troughing.

25. An apparatus as claimed in claim 24, wherein the platform pivotally supports the energy accumulator.

26. An apparatus as claimed in claim 24, wherein the function is a function of the separation between the float and the piston assembly.

27. An apparatus as claimed in claim 24, wherein at least two of the plurality of cylinders are concentric and the respective at least two of the plurality of piston-heads are concentric with each other and with the at least two of the plurality of cylinders.

28. An apparatus as claimed in claim 27, wherein the at least two of the plurality of cylinders and the at least two of the plurality of piston-heads are telescopic.

29. An apparatus as claimed in claim 28, wherein if a first of the respective at least two of the plurality of piston-heads, hereinafter identified as a first piston-head, is a member of the subset, then a second of the respective at least two of the plurality of piston-heads, hereinafter identified as a second piston-head, becomes a member when the disposition between the first piston-head and the second piston-head is within a threshold amount.

30. An apparatus as claimed in claim 29, wherein the disposition is a separation.

31. An apparatus as claimed in claim 30, further including a catch operable to releasably connect the second piston-head to the first piston-head when the two are disposed within the threshold amount.

32. An apparatus as claimed in claim 31, wherein the second piston-head is formed from the first piston-head and an annulus that circumscribes the first piston-head when first piston-head and the second piston-head are disposed within the threshold amount.

33. An apparatus as claimed in claim 32, wherein the annulus caps the one of the at least two of the plurality of cylinders that the first piston traverses.

34. An apparatus as claimed in claim 33, wherein the first fluid is a liquid.

35. An apparatus as claimed in claim 29, wherein the disposition is a pressure of a volume of the first fluid captured between the first piston-head and the second piston-head.

36. An apparatus as claimed in claim 35, further comprising a pressure-release valve in the second piston-head connected to transfer first fluid pressurized to the threshold amount by the first piston-head for pressurization by the second piston-head.

37. An apparatus as claimed in claim 36, wherein the first fluid is a gas.

38. An apparatus as claimed in claim 24, wherein the members of the subset of the plurality of piston-heads are distributed for balance around the piston rod assembly.

39. An apparatus as claimed in claim 38, wherein:
(a) a first one of the members of the subset of the plurality of piston-heads, hereinafter identified as a first piston-head, is centered on the longitudinal axis of the piston rod assembly;
(b) a second one of the plurality of piston-heads, hereinafter identified as a second piston-head, is adjacent and parallel to the first piston-head; and
(c) a third one of the plurality of piston-heads, hereinafter identified as a third piston-head, is adjacent and parallel to the first piston-head, opposite the second piston-head.

40. An apparatus as claimed in claim 39, wherein the second piston-head and the third piston-head each become a member of the subset of the plurality of piston-heads when their respective disposition with the first piston-head is within a threshold amount.

41. An apparatus as claimed in claim 40, wherein the respective disposition is a separation.

42. An apparatus as claimed in claim 41, further including a catch affixed to piston rod assembly and operable to releasably connect the first piston-head, the second piston-head and the third piston-head for simultaneous traverse when the respective disposition is within the threshold amount.

43. An apparatus as claimed in claim 24, wherein the buoyancy of the float is variable.

44. An apparatus as claimed in claim 43, wherein the buoyancy of the float is a function of the separation between the float and the piston assembly.

45. An apparatus as claimed in claim 44, wherein the buoyancy of the float is a function of the extension of the piston rod assembly.

46. An apparatus as claimed in claim 43, wherein the buoyancy of the float is a function of the amplitude of the incident wave.

47. An apparatus as claimed in claim 43, wherein the buoyancy of the float is a function of the energy of the incident wave.

48. An apparatus as claimed in claim 43, wherein the buoyancy of the float is a function of the energy being converted.

49. An apparatus as claimed in claim 43, wherein the float tapers narrower from top to bottom.

50. An apparatus for converting kinetic energy, comprising:
   a) a plurality of means for receiving a first fluid at a first pressure and supplying the first fluid at a second pressure that is higher than the first pressure;
   b) a plurality of means for pressurizing the first fluid, each of the plurality of pressurizing means cooperating with a respective one of the plurality of receiving and supplying means; and
   c) means for urging a subset of the plurality of pressurizing means to pressurize the first fluid in response to the kinetic energy, wherein the aggregate piston-head area of the members of the subset increases as a function of the energy being converted.

51. An apparatus as claimed in claim 50, wherein the function is a function of the instantaneous energy being converted.

52. An apparatus as claimed in claim 51, wherein the function provides that the aggregate area over which the plurality of pressurizing means work increases as the instantaneous energy being converted increases.

53. An apparatus as claimed in claim 52, wherein the function is discontinuous.

54. An apparatus as claimed in claim 53, wherein the aggregate area over which the plurality of pressurizing means work increases as a result of the membership of the subset gaining an increased number of the plurality pressurizing means.

55. An apparatus as claimed in claim 53, wherein the aggregate area over which the plurality of pressurizing means work increases as a result of the membership of the subset gaining larger-area ones of the plurality of pressurizing means.

56. An apparatus as claimed in claim 53, wherein the aggregate area over which the plurality of pressurizing means work increases as a result of at least one member of the subset increasing the area over which it applies pressure.

57. An apparatus as claimed in claim 50, further including:
   a) means for supporting the pressurizing means at a predetermined average distance below the surface of a second fluid; and
   b) means for floating on the second fluid in the path of an incident wave connected to drive the urging means in response to the incident wave cresting and troughing.

58. An apparatus as claimed in claim 57, wherein the function is a function of the separation between the floating means and the pressurizing means.

59. An apparatus as claimed in claim 57, wherein the buoyancy of the floating means is variable.

60. An apparatus as claimed in claim 59, wherein the buoyancy of the floating means is a function of the separation between the floating means and the pressurizing means.

61. An apparatus as claimed in claim 59, wherein the buoyancy of the floating means is a function of the amplitude of the incident wave.

62. An apparatus as claimed in claim 59, wherein the buoyancy of the floating means is a function of the energy of the incident wave.

63. An apparatus as claimed in claim 59, wherein the buoyancy of the floating means is a function of the energy being converted.

64. An apparatus as claimed in claim 59, wherein the floating means tapers narrower from top to bottom.

* * * * *